US011435134B2

(12) United States Patent
Gwon et al.

(10) Patent No.: US 11,435,134 B2
(45) Date of Patent: Sep. 6, 2022

(54) REFRIGERATOR

(71) Applicant: LG ELECTRONICS INC., Seoul (KR)

(72) Inventors: Seongwon Gwon, Seoul (KR); Seungyoon Cho, Seoul (KR); Jinho Chang, Seoul (KR)

(73) Assignee: LG Electronics Inc., Seoul (KR)

(*) Notice: Subject to any disclaimer, the term of this patent is extended or adjusted under 35 U.S.C. 154(b) by 0 days.

(21) Appl. No.: 17/269,471

(22) PCT Filed: Aug. 28, 2019

(86) PCT No.: PCT/KR2019/011015
§ 371 (c)(1),
(2) Date: Feb. 18, 2021

(87) PCT Pub. No.: WO2020/045991
PCT Pub. Date: Mar. 5, 2020

(65) Prior Publication Data
US 2021/0310725 A1 Oct. 7, 2021

(30) Foreign Application Priority Data
Aug. 30, 2018 (KR) .................. 10-2018-0102666

(51) Int. Cl.
*F25D 25/04* (2006.01)
*A47B 88/457* (2017.01)
(Continued)

(52) U.S. Cl.
CPC ............ *F25D 25/04* (2013.01); *A47B 88/457* (2017.01); *F25D 25/025* (2013.01);
(Continued)

(58) Field of Classification Search
CPC ...... F25D 25/005; F25D 25/025; F25D 25/04; F25D 25/022; F25D 23/021;
(Continued)

(56) References Cited

U.S. PATENT DOCUMENTS 7,628,461 B2* 12/2009 Carden ................. F25D 25/025
312/310
9,933,201 B2 4/2018 Yi et al.
(Continued)

FOREIGN PATENT DOCUMENTS

CN 102155840 A 8/2011
CN 102226626 A 10/2011
(Continued)

*Primary Examiner* — Andrew M Roersma
(74) *Attorney, Agent, or Firm* — Dentons US LLP

(57) ABSTRACT

A refrigerator includes a cabinet having a storage space; a door including a door unit to open or close the storage space and a drawer unit to provide a receiving space; rails to connect the door and the cabinet to through which the door is drawn in or out of the cabinet; a driving device disposed at the door unit to provide power; and an elevation device disposed at the drawer unit and connected with the driving device to move up or down at the drawer unit. The driving device includes: a motor assembly; a screw unit including a screw to be rotated by the motor assembly and a screw holder to move up or down along the screw; and a lever to connect the screw holder and the elevation device and rotate when the screw holder moves up or down. The motor assembly includes: a driving motor; and a power transmission unit to transmit power from the motor to the screw unit, and the screw is disposed to be inclined with respect to a vertical line passing in a top-bottom direction of the refrigerator.

20 Claims, 24 Drawing Sheets

(51) Int. Cl.
  *F25D 25/02* (2006.01)
  *F25D 29/00* (2006.01)
  *A47B 88/90* (2017.01)
(52) U.S. Cl.
  CPC ...... *F25D 29/005* (2013.01); *A47B 2088/901* (2017.01); *A47B 2210/175* (2013.01)
(58) Field of Classification Search
  CPC . F25D 29/005; A47B 88/457; A47B 88/0414; A47B 2088/901; A47B 2210/175
  See application file for complete search history.

(56) References Cited

U.S. PATENT DOCUMENTS

| | | | |
|---|---|---|---|
| 2006/0021373 A1* | 2/2006 | Oh | F25D 25/025 62/407 |
| 2006/0087208 A1 | 4/2006 | Oh et al. | |
| 2008/0238278 A1 | 10/2008 | Jeong et al. | |
| 2014/0265797 A1* | 9/2014 | Scheuring | A47B 51/00 312/404 |
| 2014/0265798 A1* | 9/2014 | Watts | F25D 23/04 312/404 |
| 2017/0051967 A1 | 2/2017 | Tierney et al. | |
| 2018/0128540 A1* | 5/2018 | Yasaka | B66F 7/28 |
| 2018/0259246 A1* | 9/2018 | Choi | F25D 25/025 |
| 2019/0292831 A1 | 9/2019 | Choi | |

FOREIGN PATENT DOCUMENTS

| | | | |
|---|---|---|---|
| CN | 105674665 A | 6/2016 | |
| EP | 3217130 A1 | 9/2017 | |
| EP | 3546863 A1 | 10/2019 | |
| JP | 2007-000307 A | 1/2007 | |
| KR | 20080101334 A | * 11/2008 | ........ F25D 25/025 |
| KR | 10-2017-0140010 A | 12/2017 | |
| KR | 10-2019-0112382 A | 10/2019 | |

\* cited by examiner

【Figure 1】
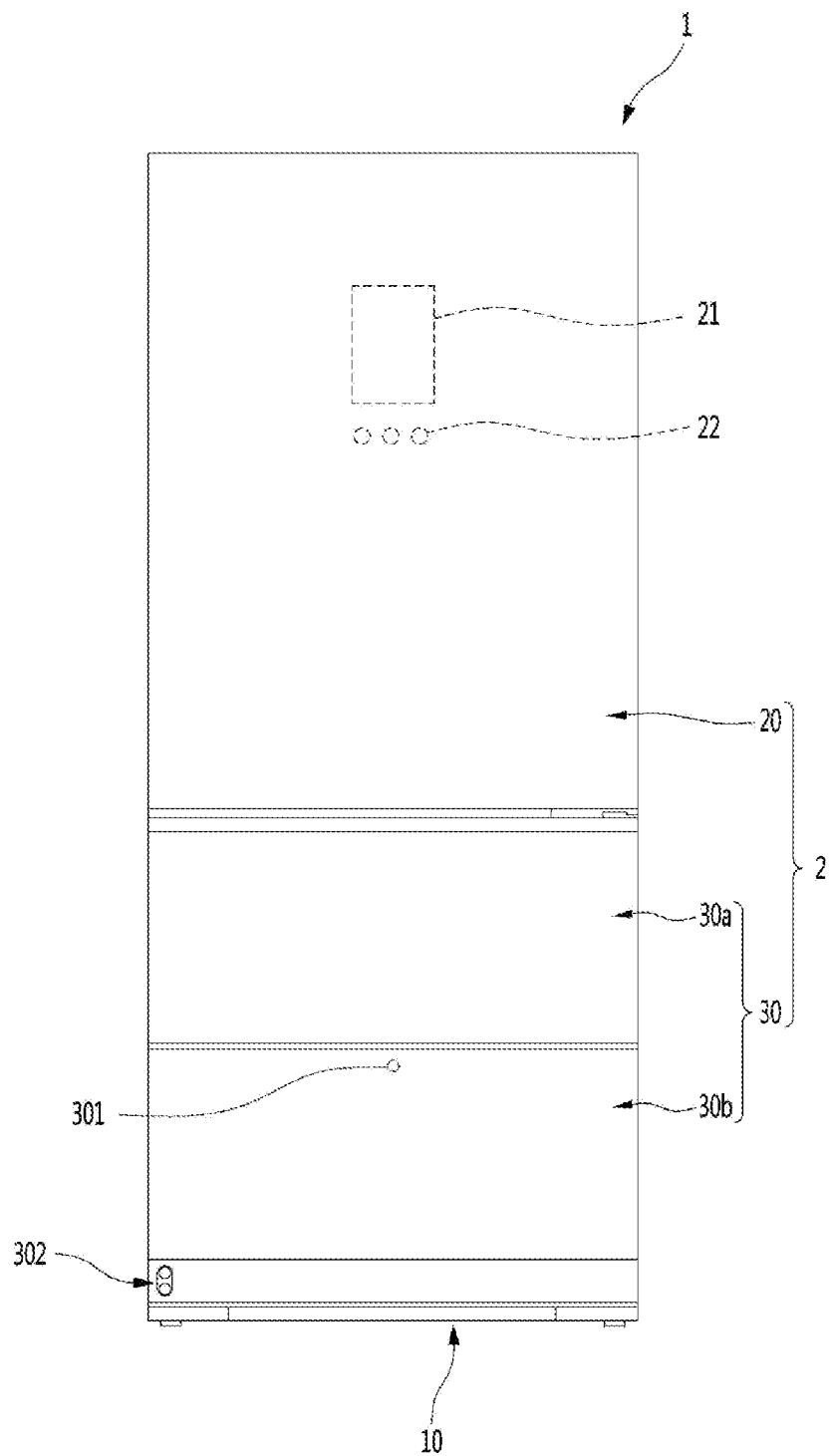

【Figure 2】
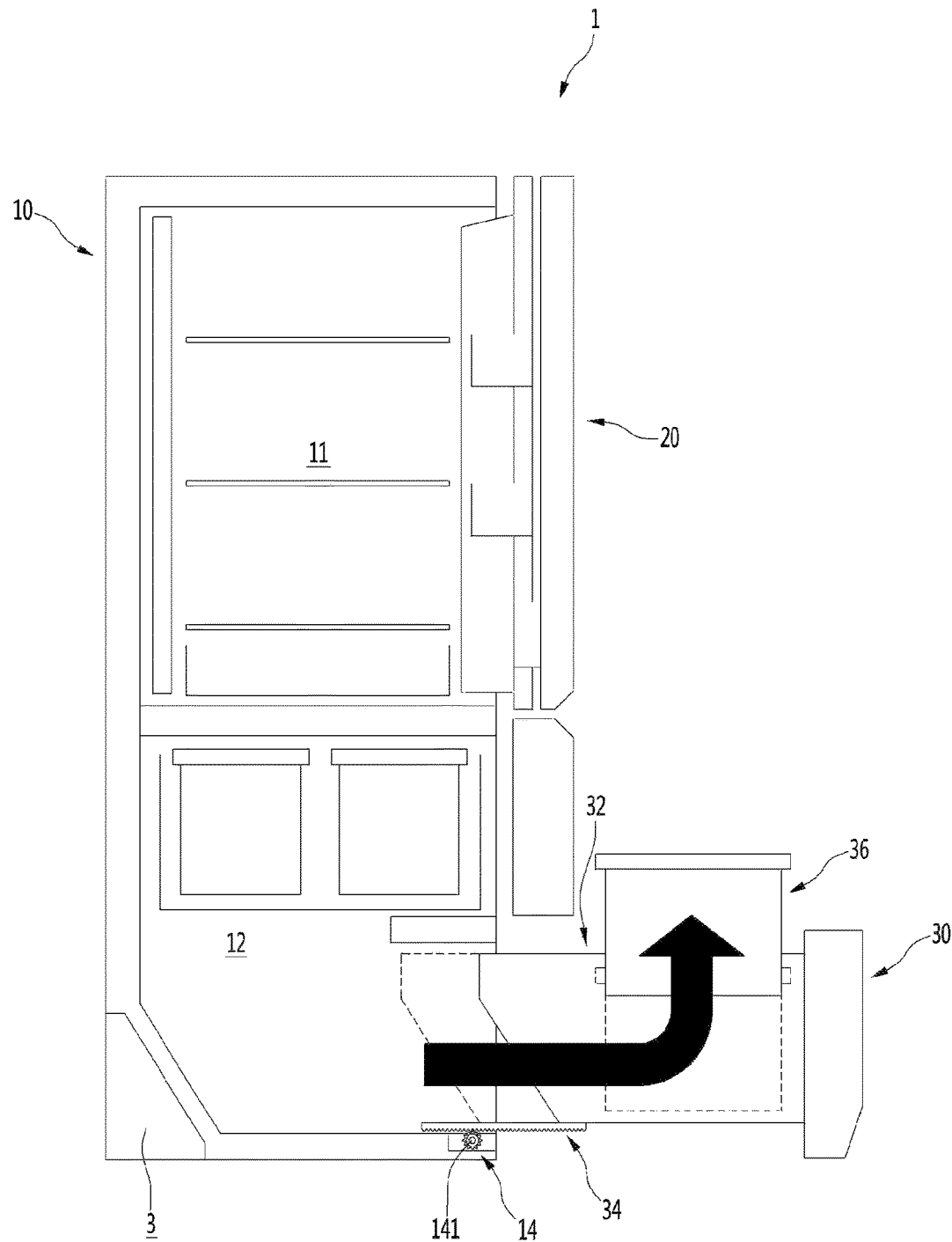

【Figure 3】
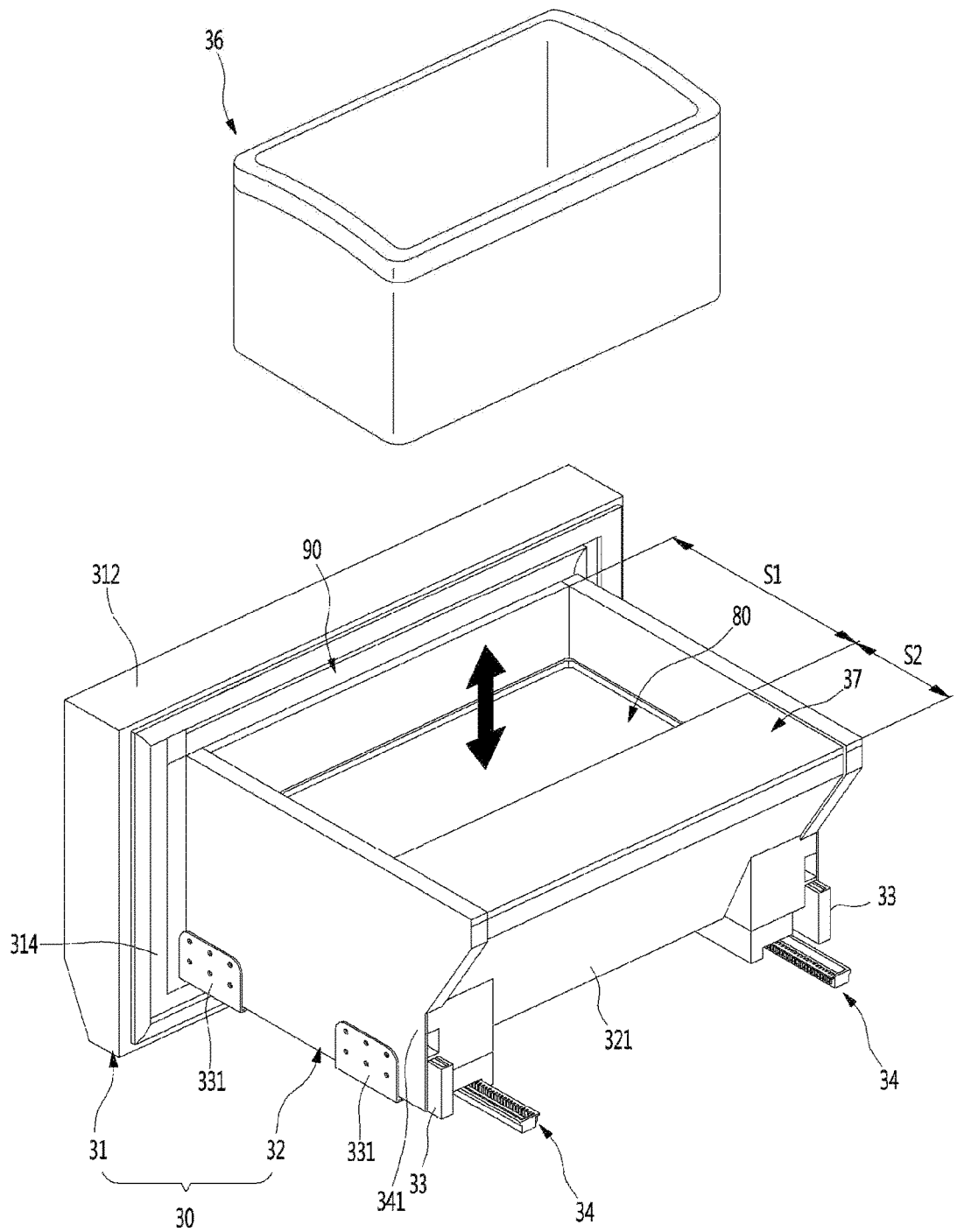

[Figure 4]
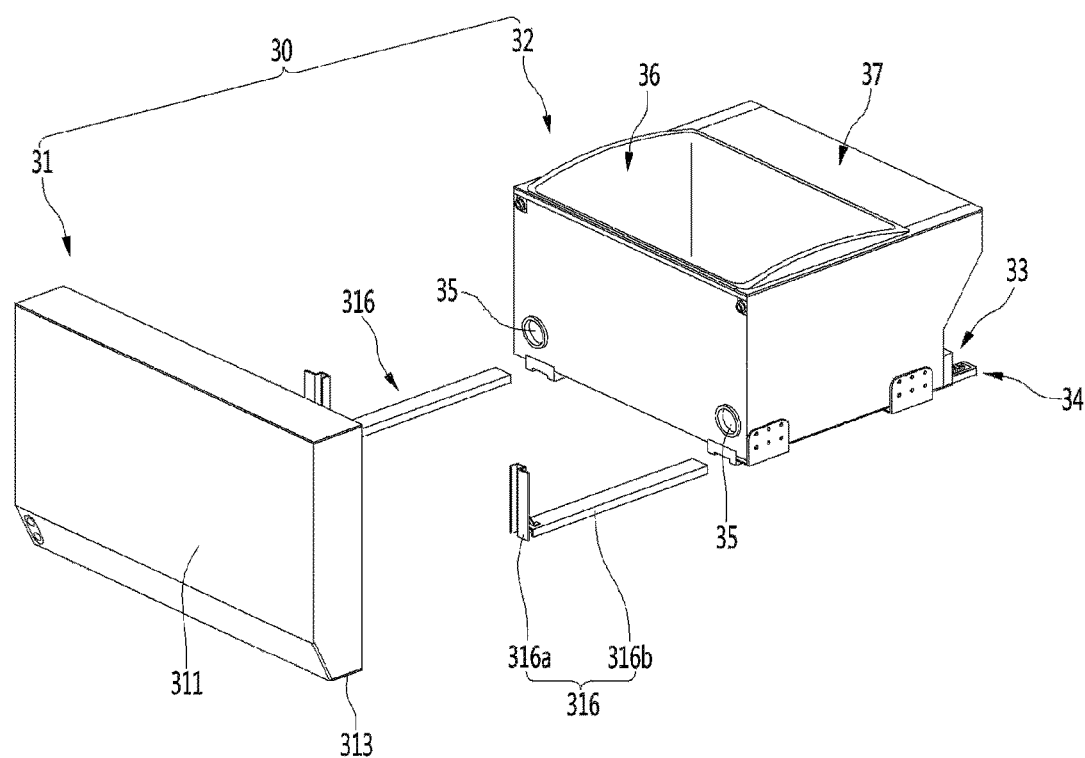

【Figure 5】
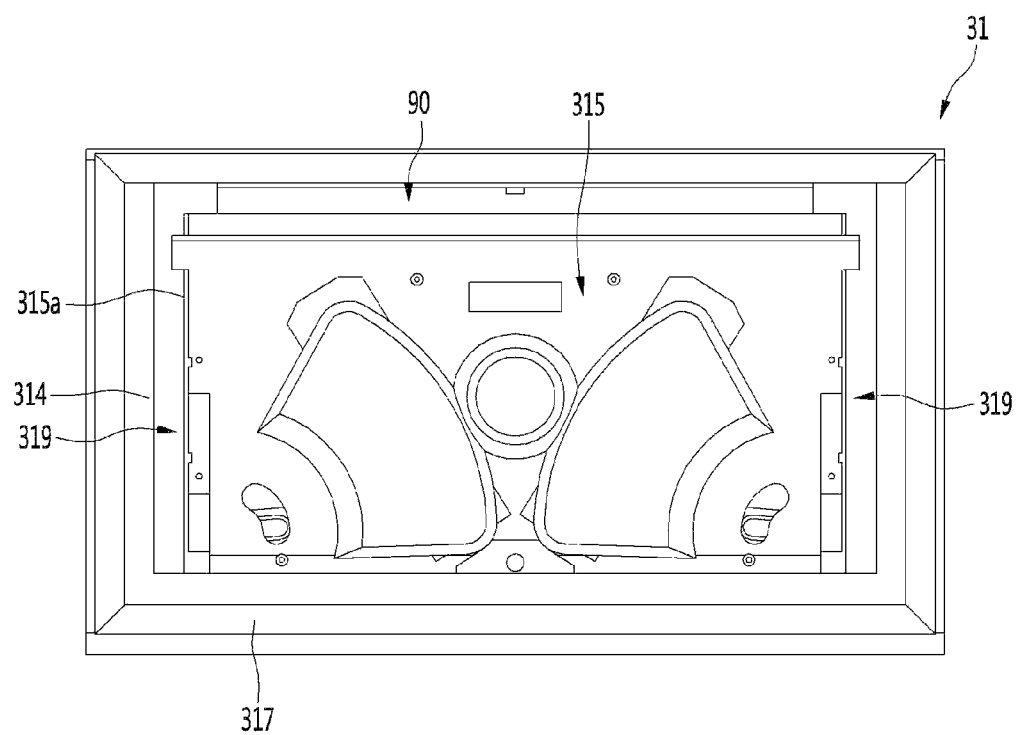

[Figure 6]
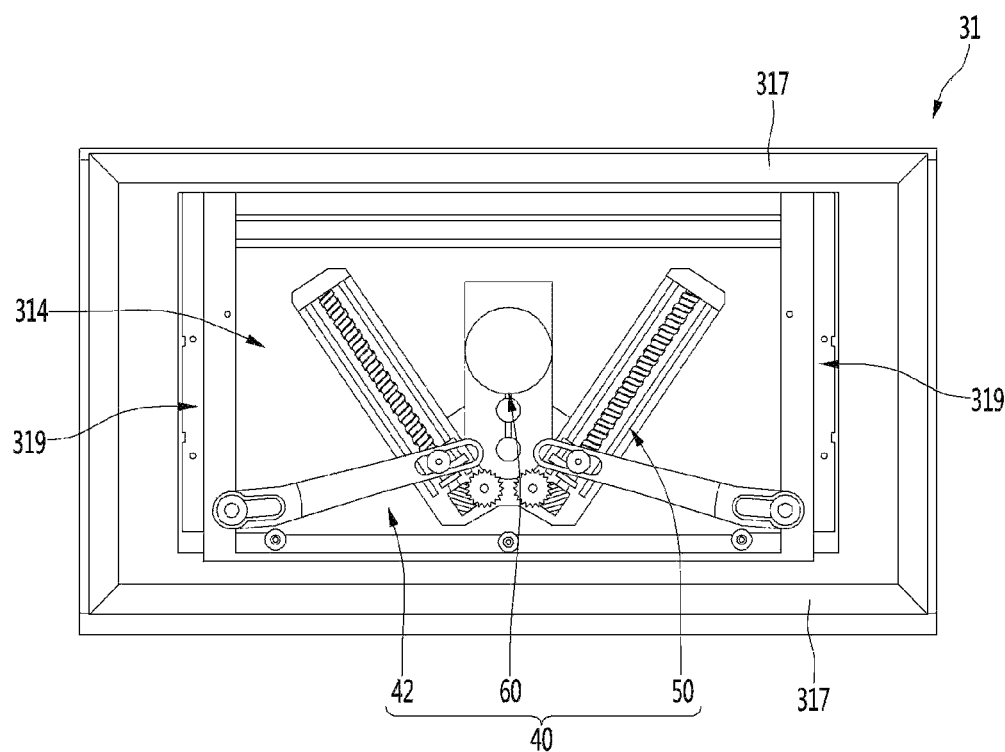

【Figure 7】
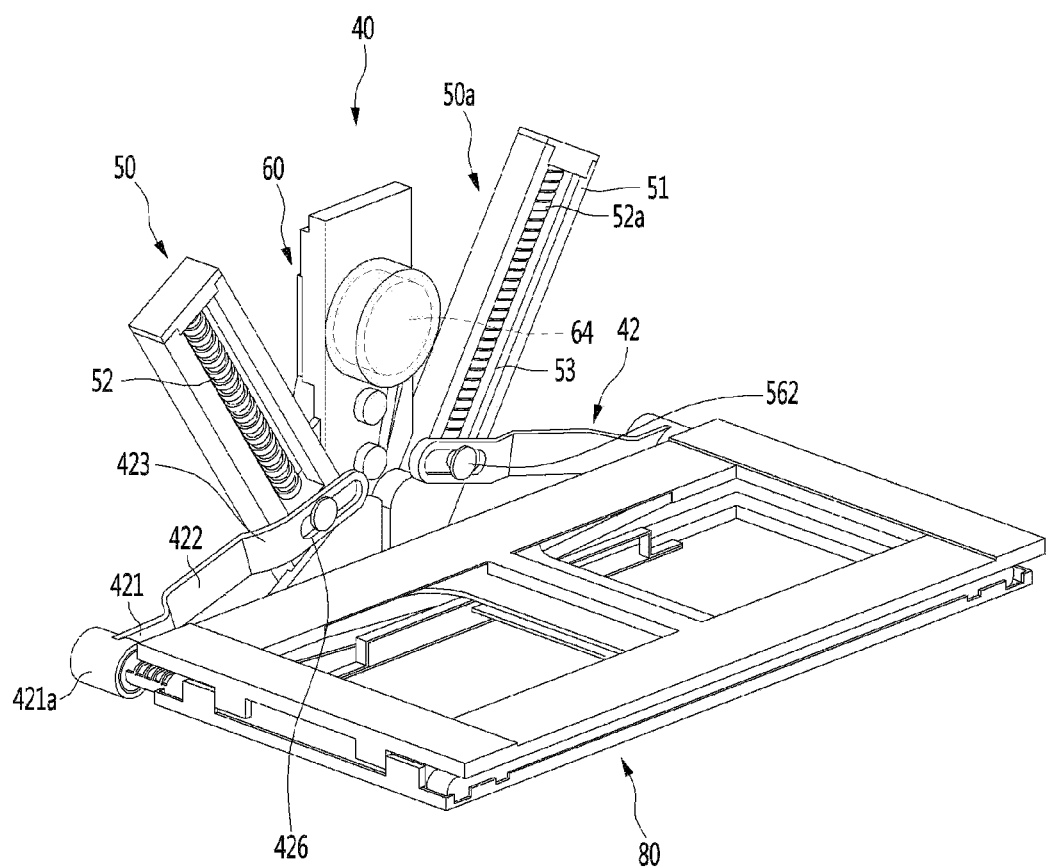

[Figure 8]
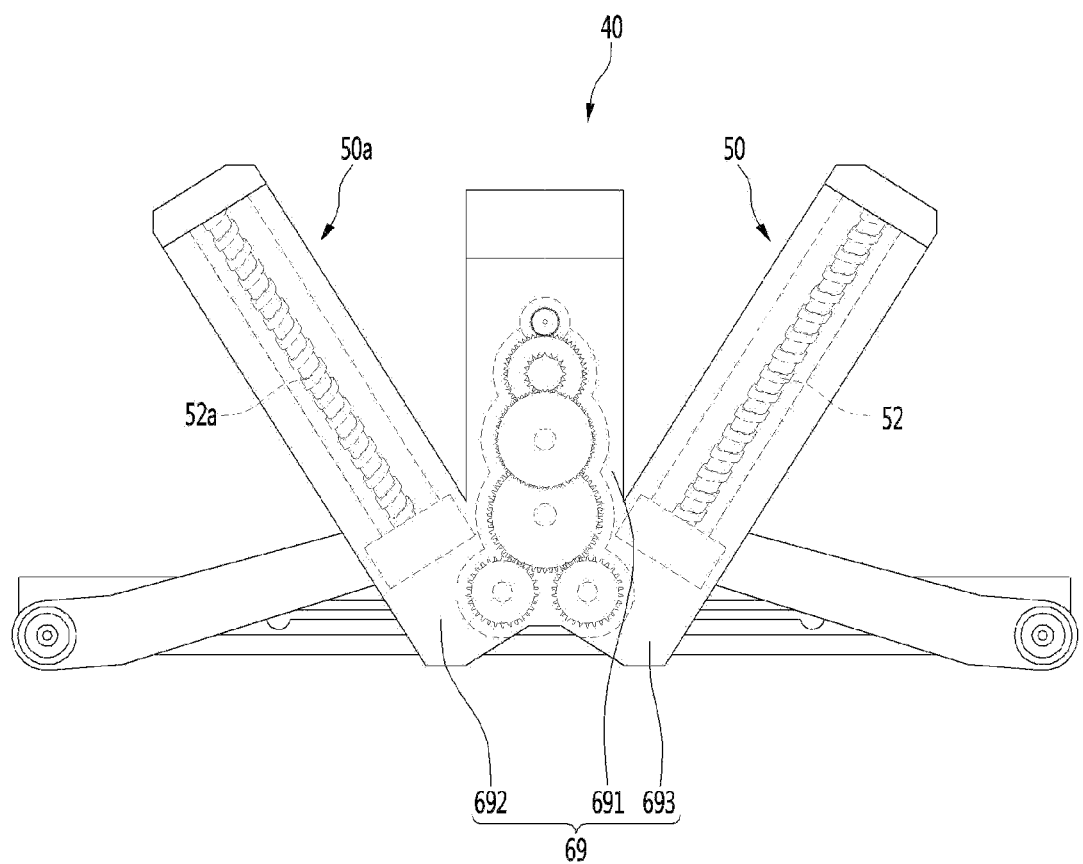

[Figure 9]
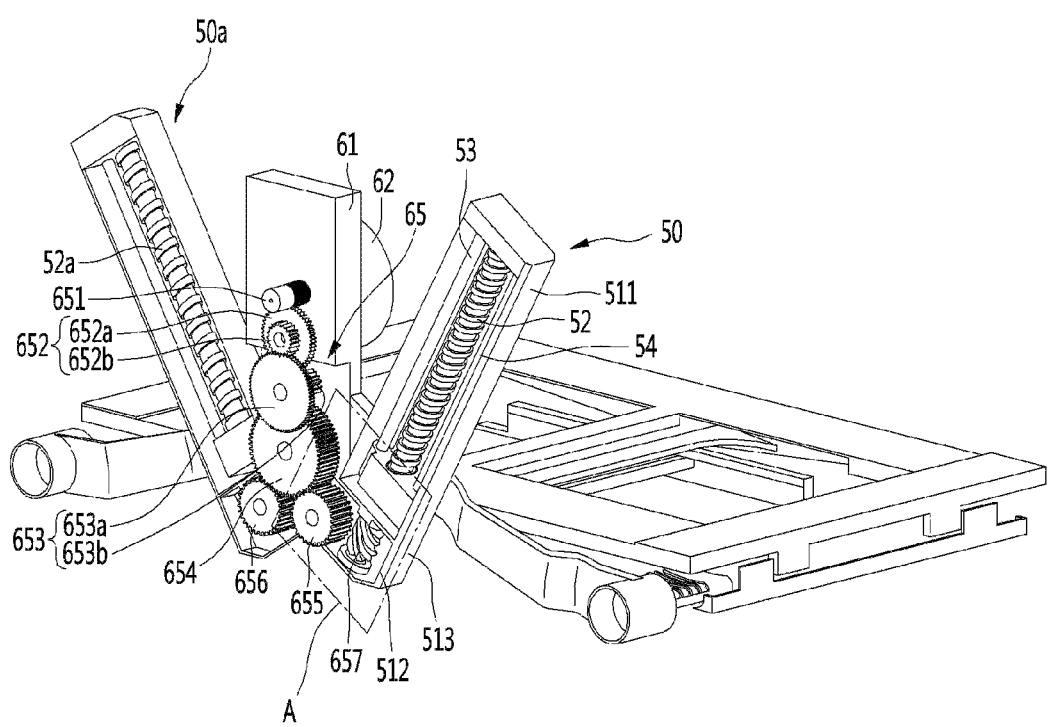

[Figure 10]
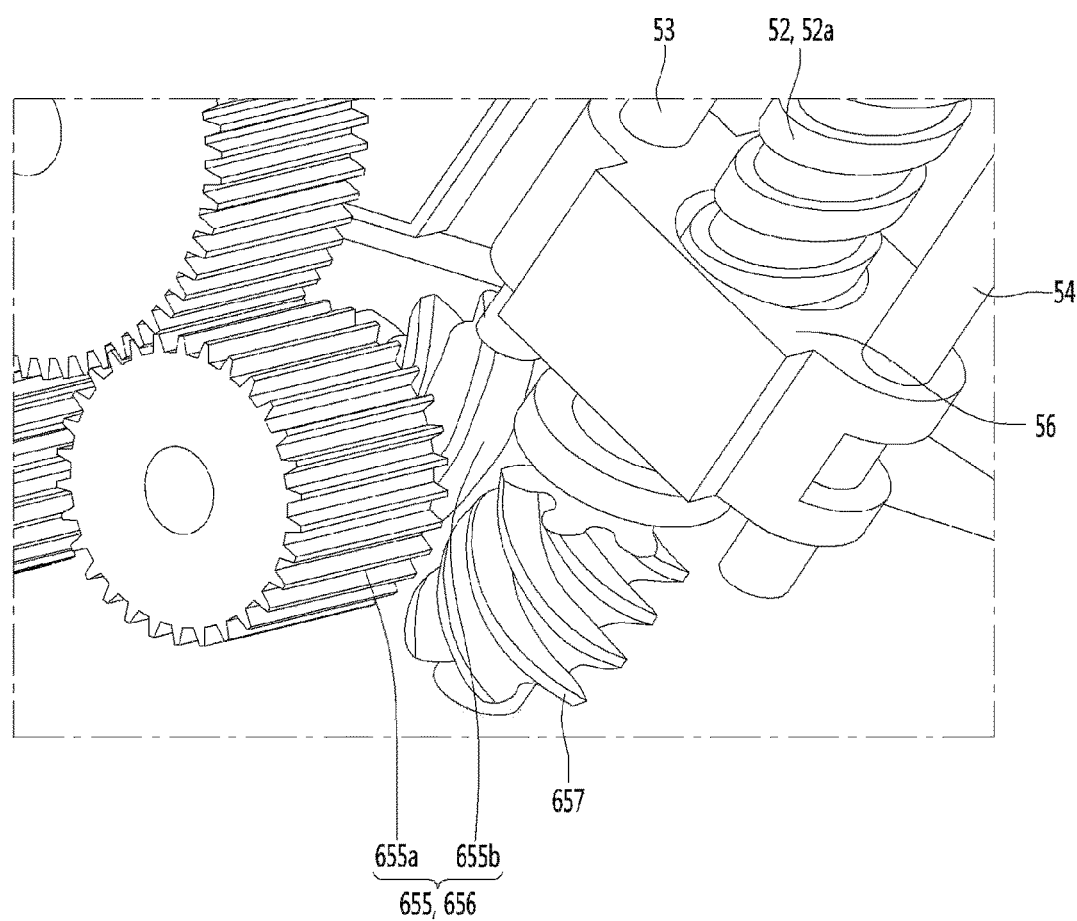

【Figure 11】
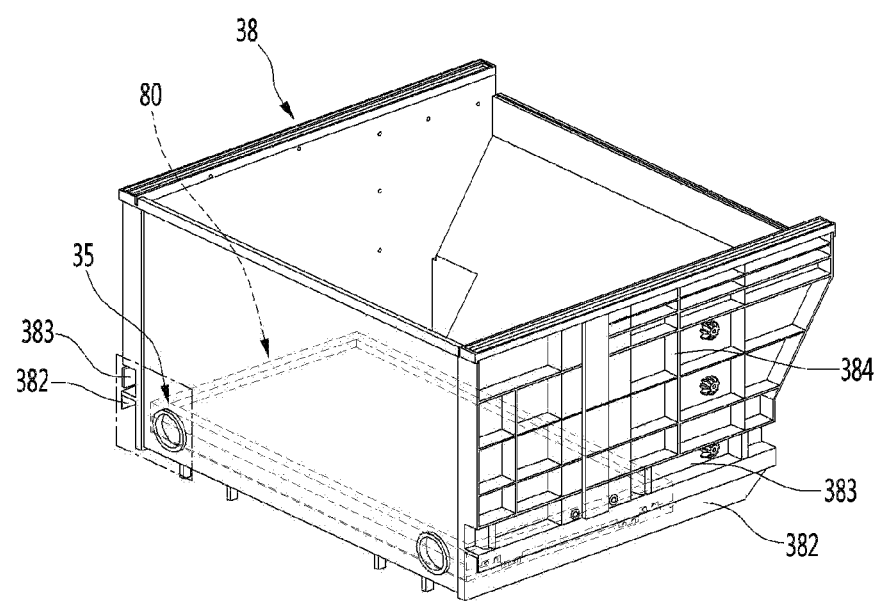

[Figure 12]
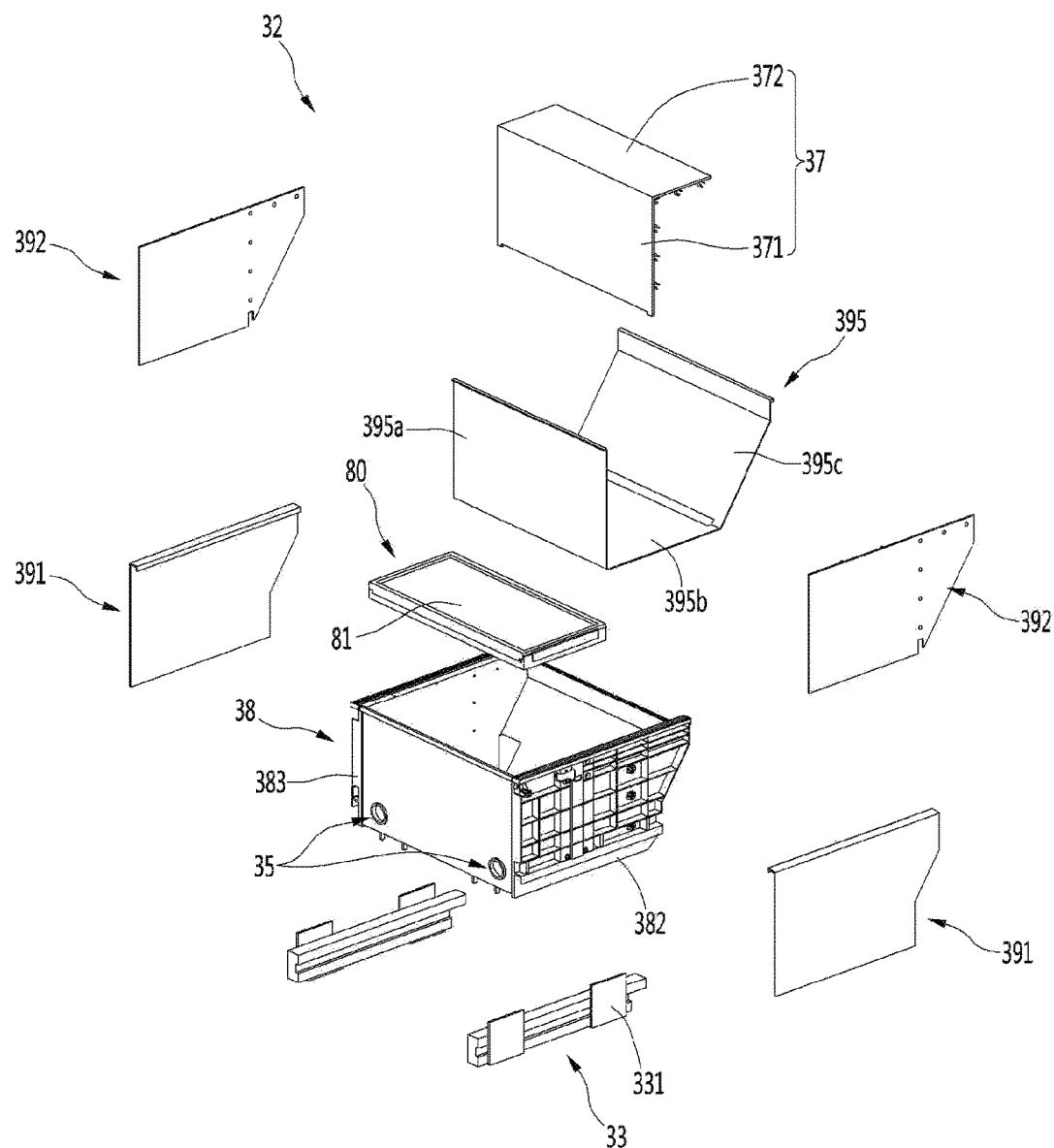

[Figure 13]
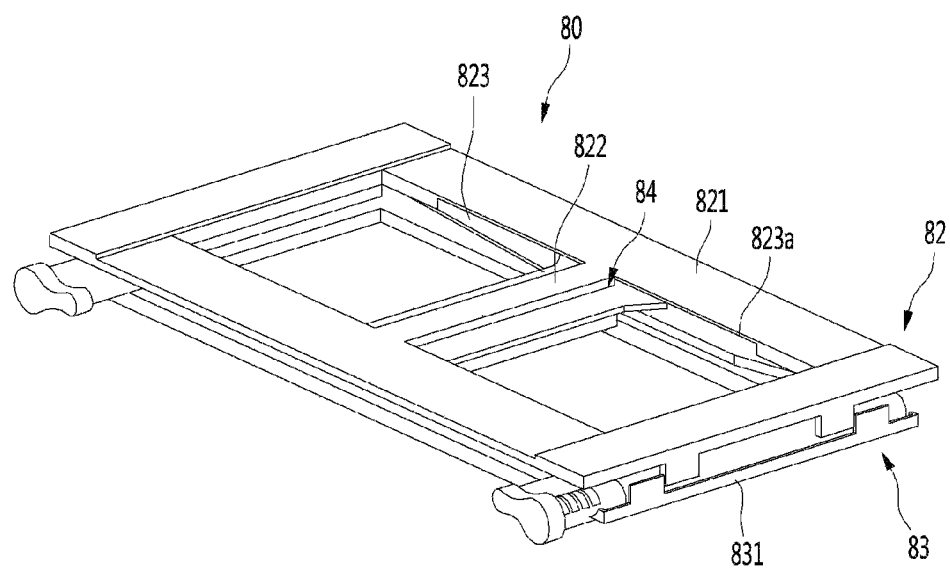

[Figure 14]
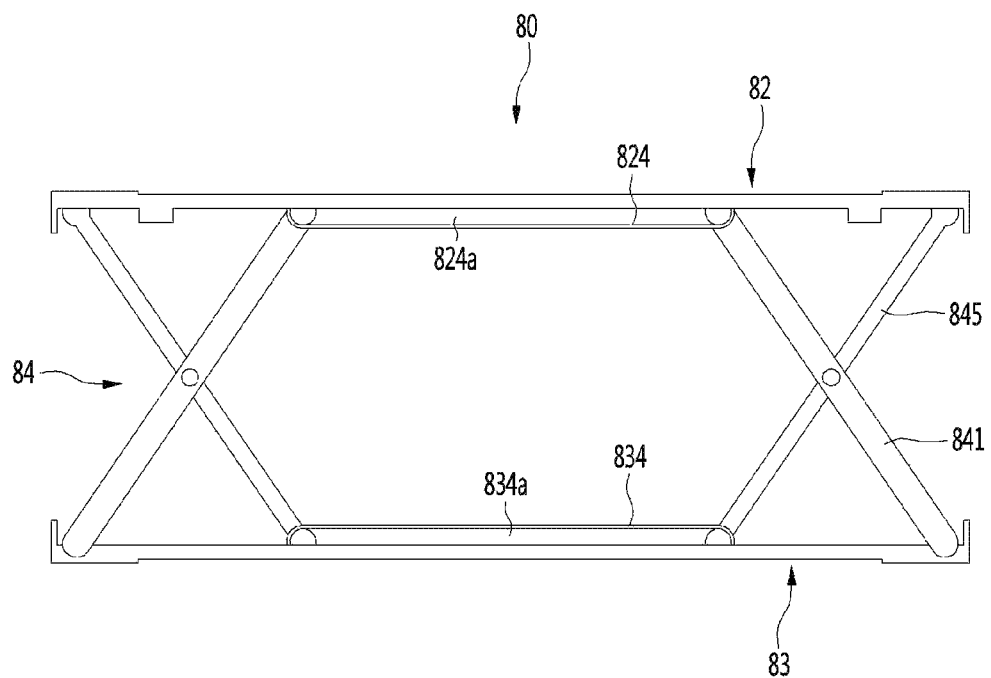

[Figure 15]
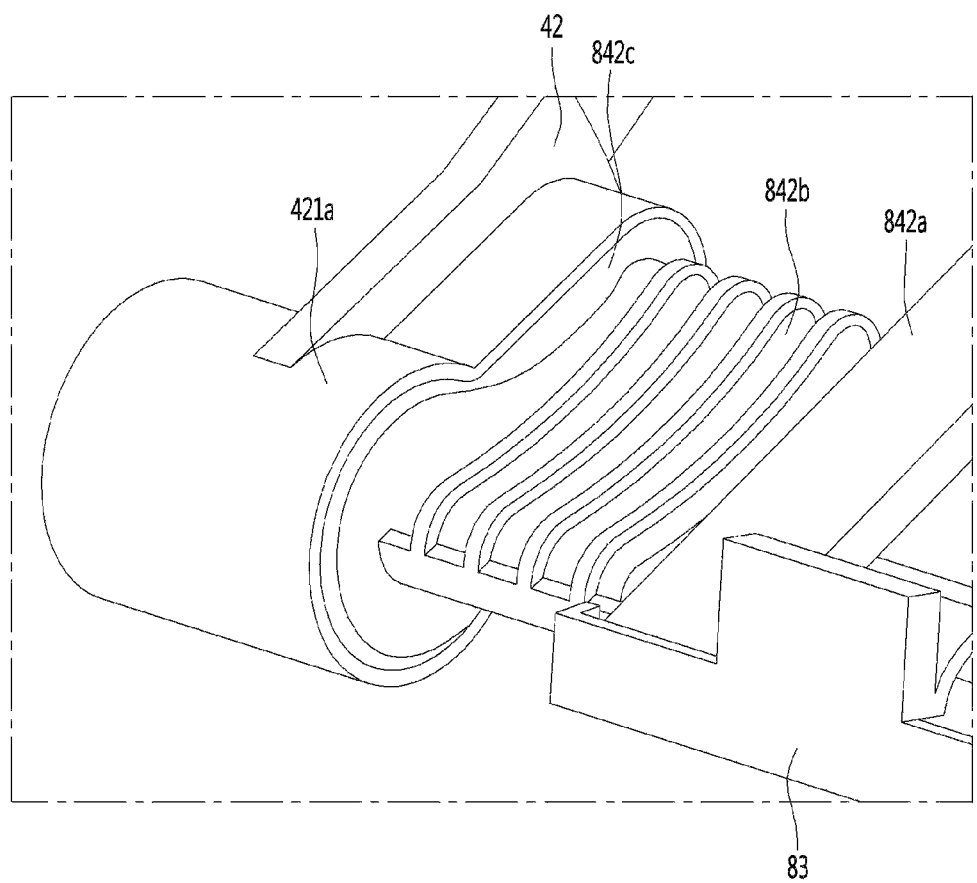

[Figure 16]
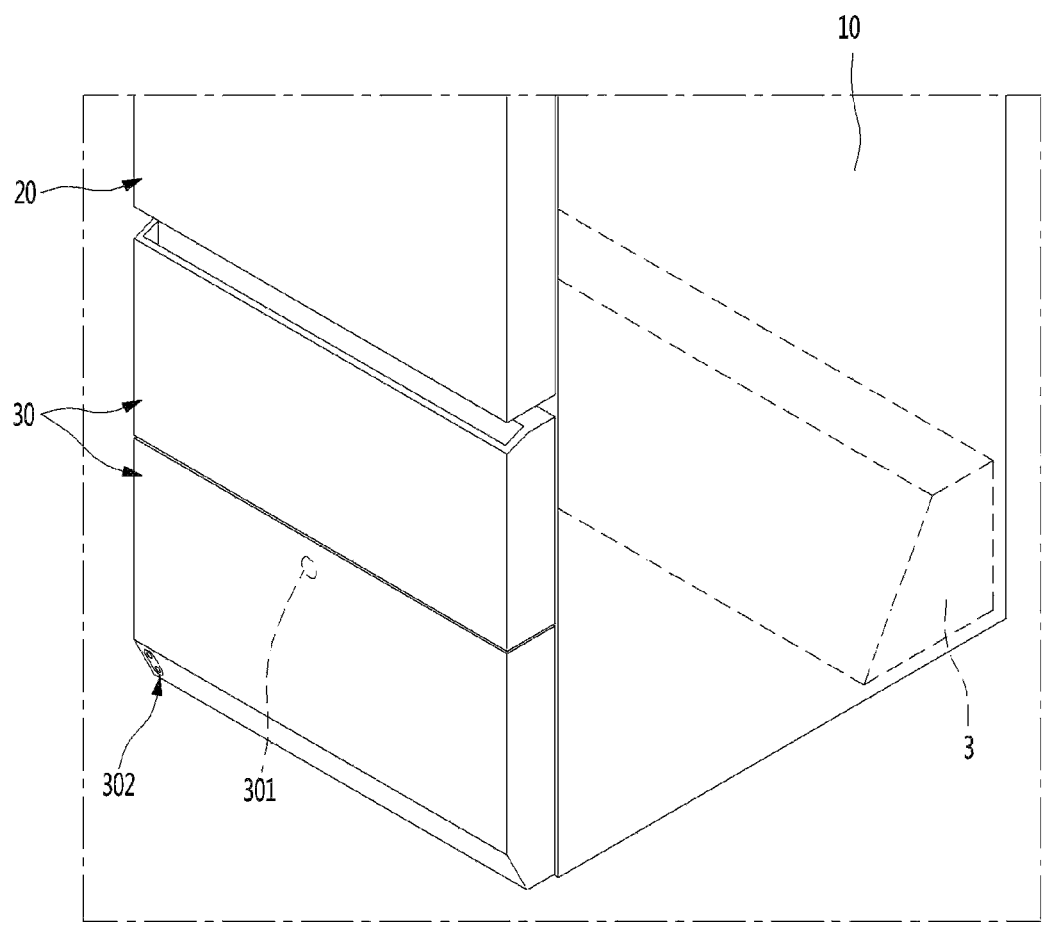

【Figure 17】
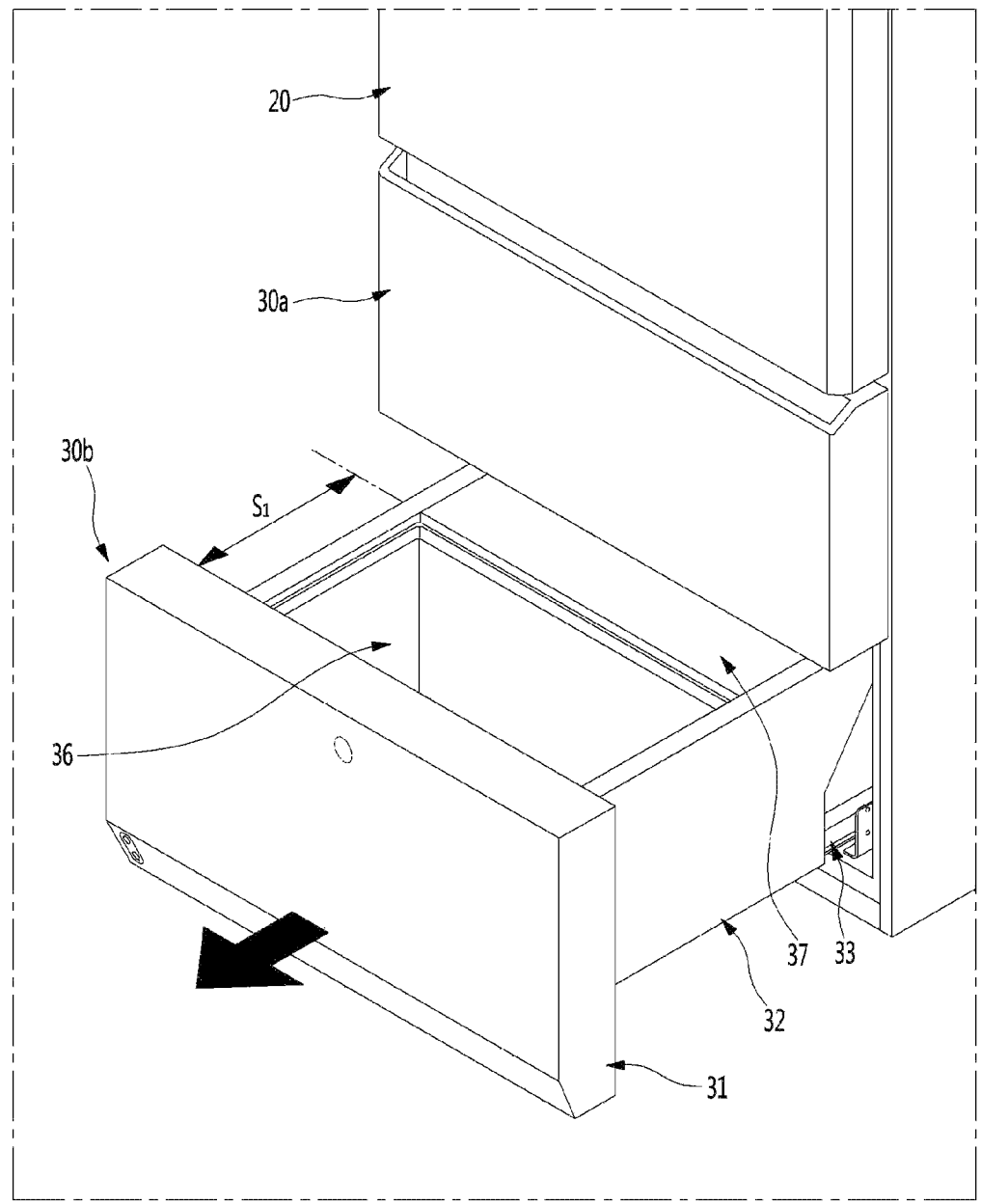

[Figure 18]
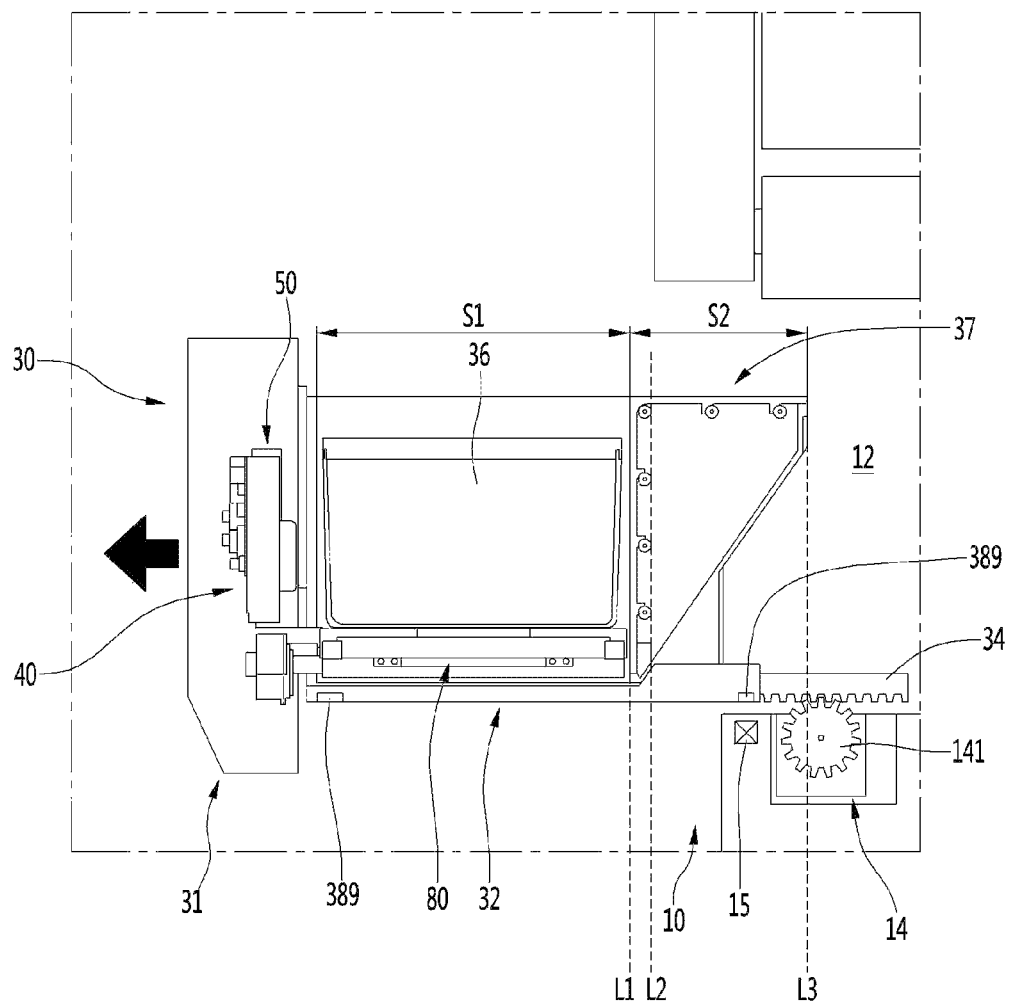

[Figure 19]
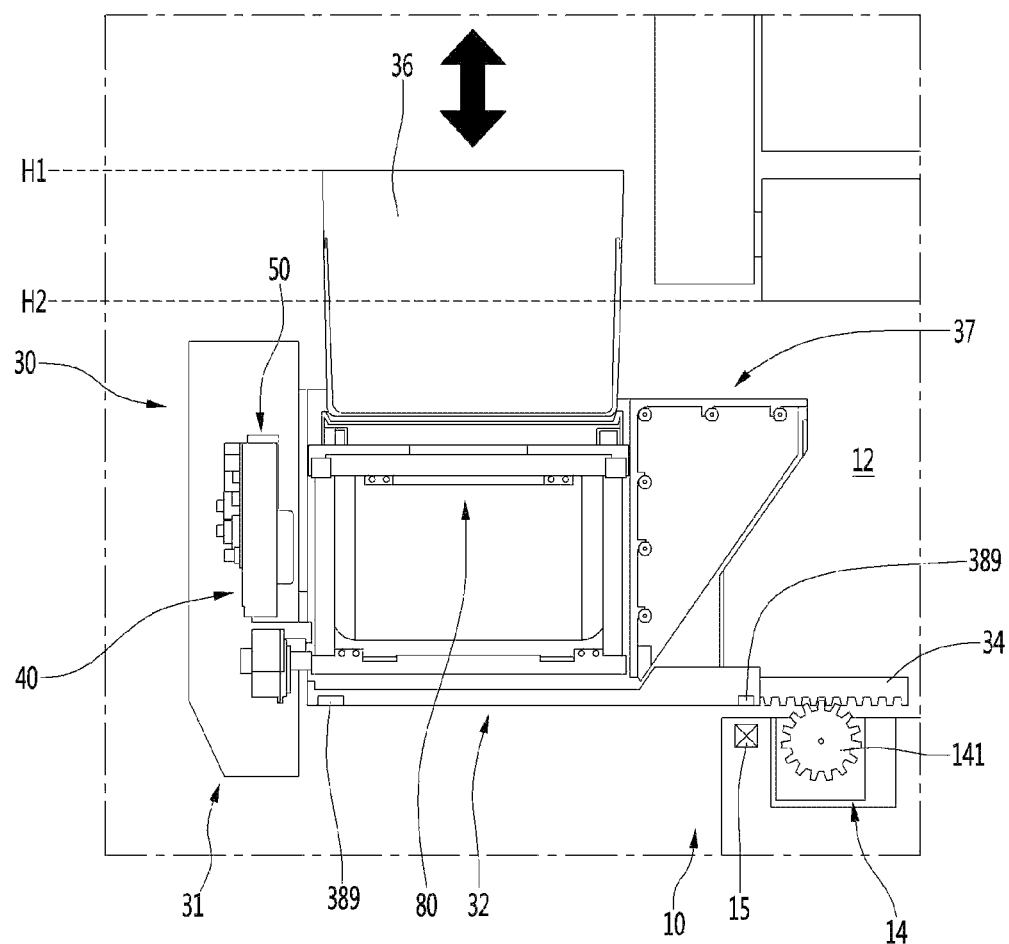

[Figure 20]
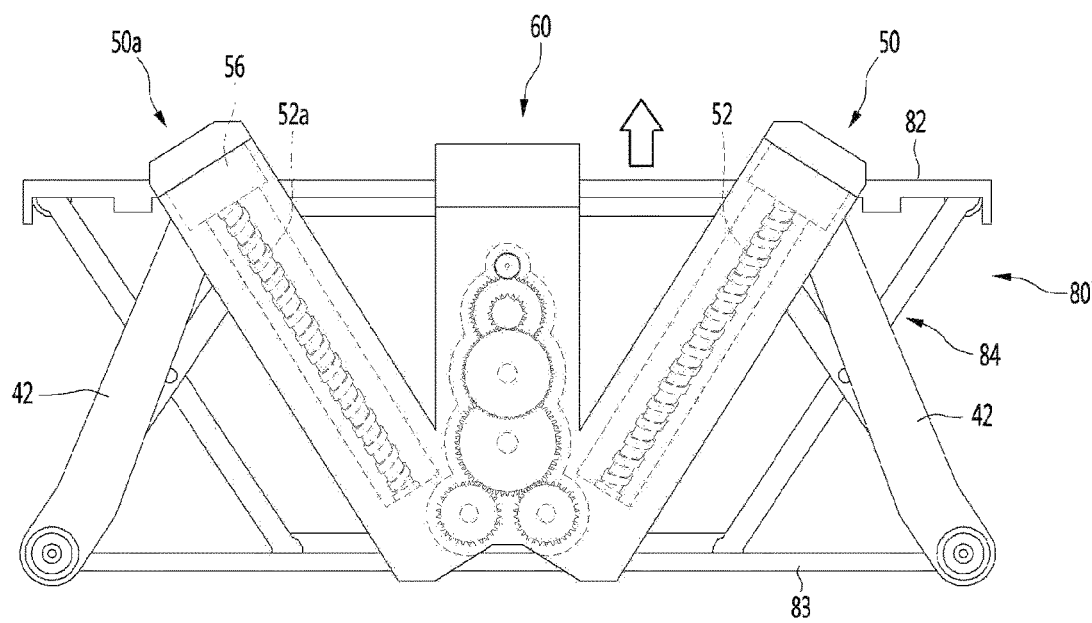

[Figure 21]
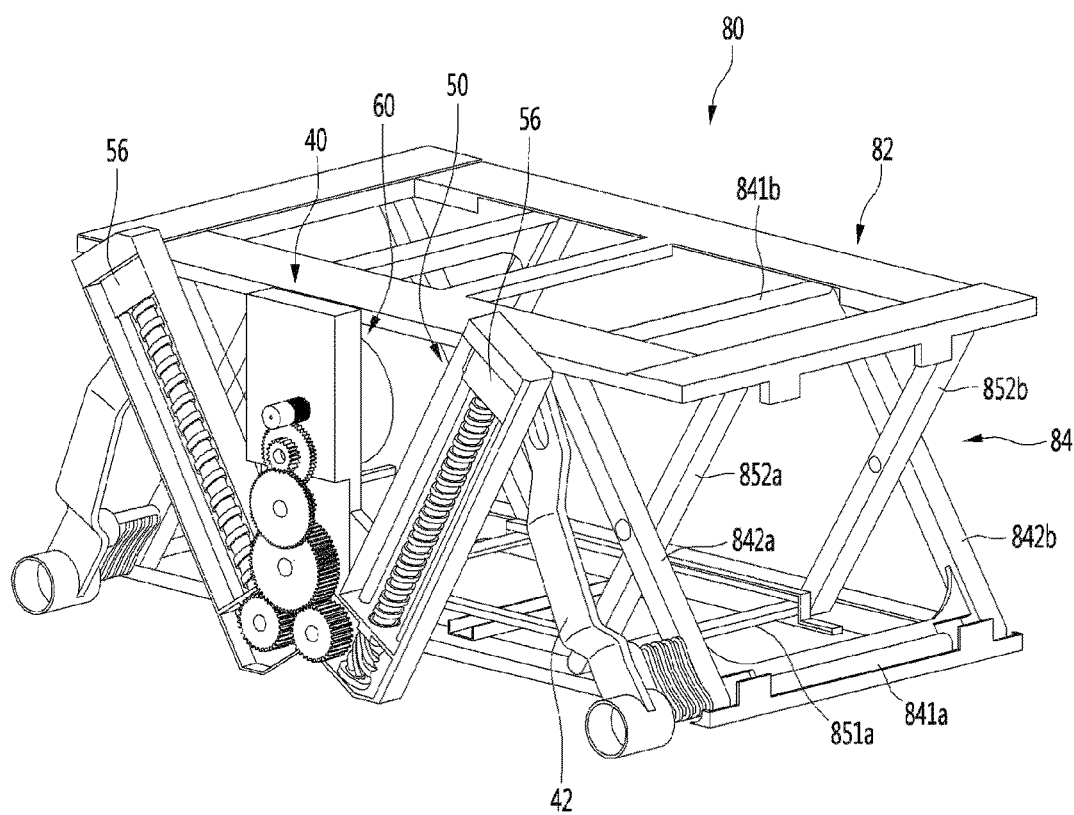

【Figure 22】
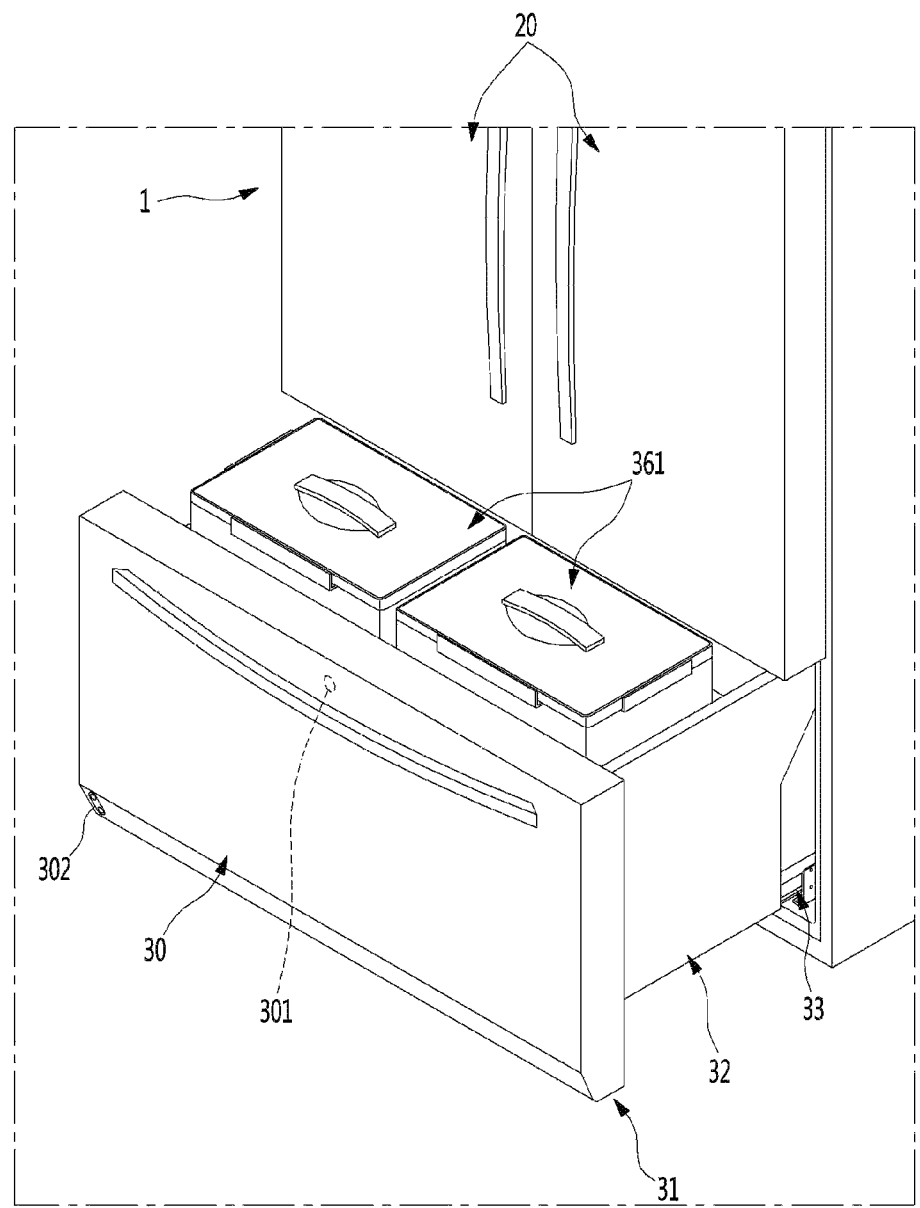

【Figure 23】
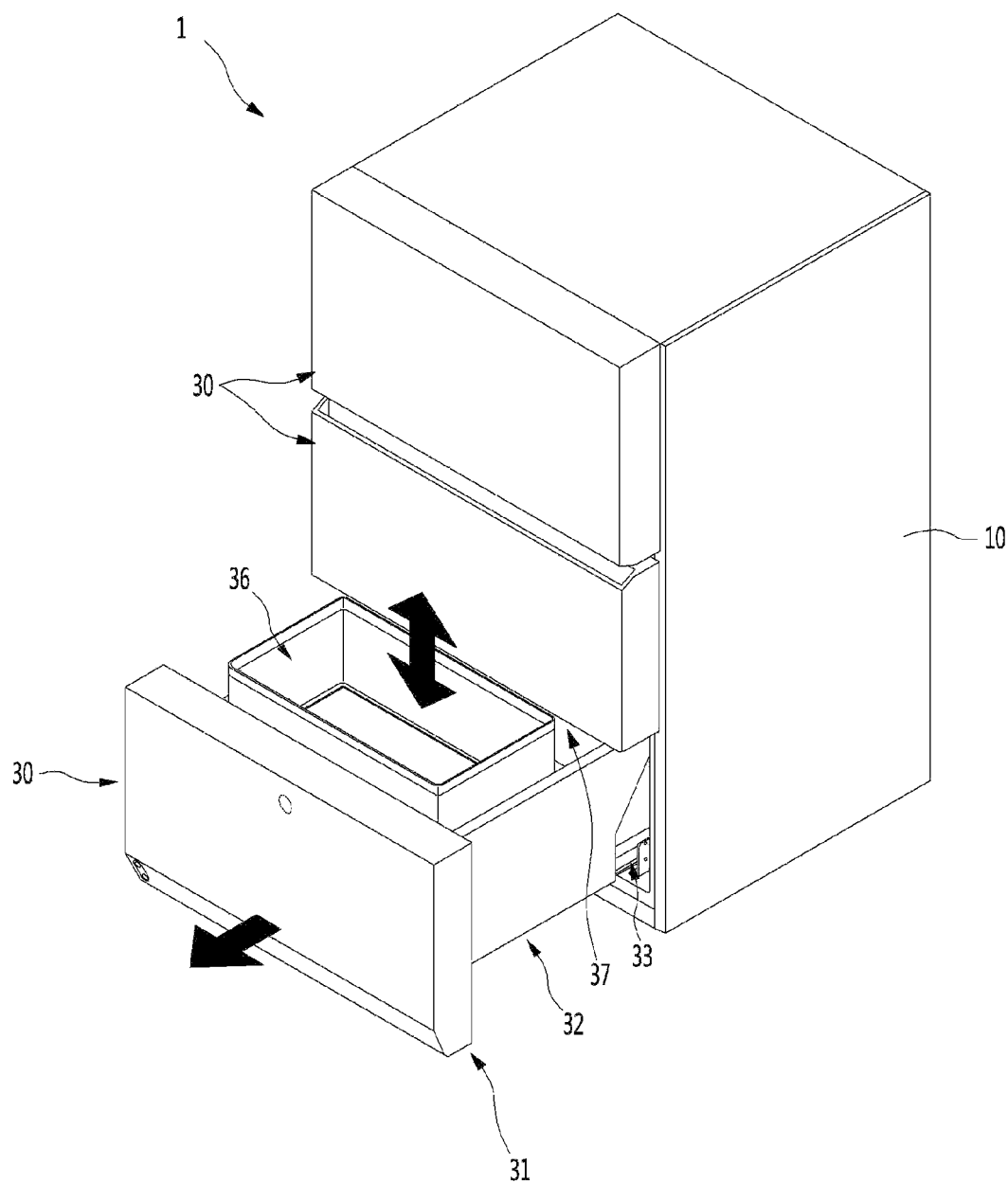

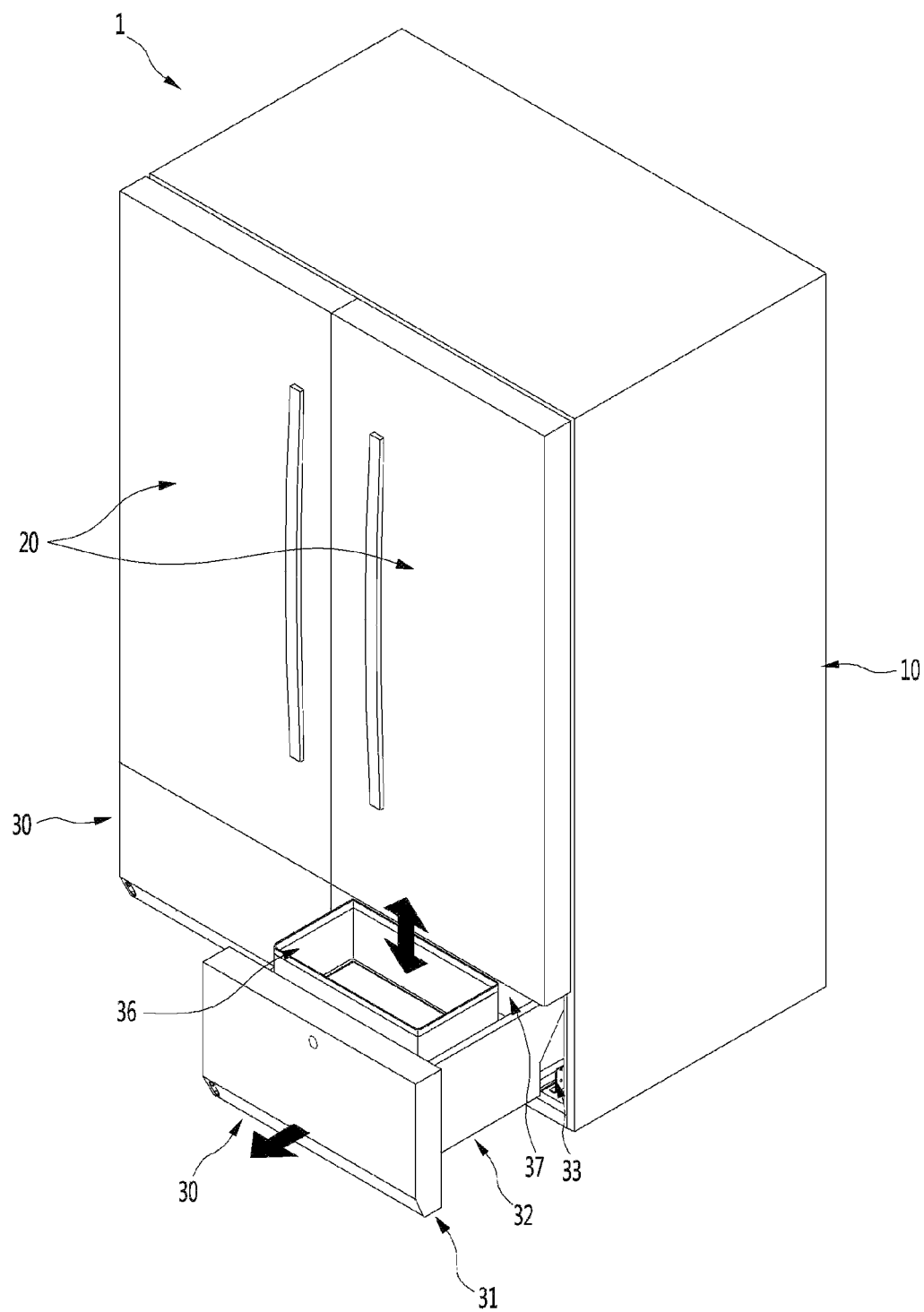
【Figure 24】

REFRIGERATOR

CROSS-REFERENCE TO RELATED APPLICATIONS

This application is a National Stage Application of International Application No. PCT/KR2019/011015, filed on Aug. 28, 2019, which claims priority to Korean Patent Application No. 10-2018-0102666 filed on Aug. 30, 2018, the disclosures of which are incorporated herein by reference in their entireties.

TECHNICAL FIELD

The present disclosure relates to a refrigerator.

BACKGROUND

In general, refrigerators are home appliances for storing foods at a low temperature in a storage space that is covered by a door. For this, refrigerators cool the inside of the storage space by using cool air generated by heat-exchange with a refrigerant circulating through a refrigeration cycle to store foods in an optimum state.

In recent years, refrigerators have become increasingly multi-functional with changes of dietary lives and gentrification of products, and refrigerators having various structures and convenience devices for convenience of users and for efficient use of internal spaces have been released.

The storage space of the refrigerator may be opened/closed by the door. Also, refrigerators may be classified into various types according to an arranged configuration of the storage space and a structure of the door for opening and closing the storage space.

The refrigerator door may be classified into a rotation-type door that opens and closes a storage space through rotation thereof and a drawer-type door that is inserted and withdrawn with a drawer.

Also, the drawer-type door is often disposed in a lower region of the refrigerator. Thus, when the drawer-type door is disposed in the lower region of the refrigerator, a user has to hunch their back to take out a basket or food in the drawer-type door. If the basket or the food is heavy, the user may feel inconvenience to use the basket or may be injured.

In order to solve such limitation, various structures are being developed in which the drawer-type door is capable of being elevated.

Representatively, a refrigerator including a lifting mechanism for moving up or down a bin disposed in a refrigerating compartment has been disclosed in U.S. Pat. No. 9,377,238.

However, in such a related art, the lifting mechanism for lifting has a structure disposed and exposed outside of the bin, which may cause a severe problem with safety. Further, there is a problem in that the external appearance is not pleasing by the exposed structure of the lifting mechanism.

Since a driving unit has a structure exposed outside, when the driving unit is operating, noise can be wholly transmitted to the outside, which may cause complaint of users.

The lifting mechanism is disposed in the refrigerator, so the storage capacity of the refrigerator may be remarkably decreased, which results in a loss of storage capacity of the entire refrigerator, thus, causing a problem in that the storage efficiency is considerably decreased.

The lifting mechanism is fully provided in the refrigerator, so it is required to separate the door and the lifting mechanism in order to service the lifting mechanism, and accordingly, it is difficult to service.

The driving unit of the lifting mechanism has a structure being able to lift the bin by pushing an end of a scissor support assembly. Accordingly, when a size of the bin is large or the bin is filled with heavy objects, there is a problem in that it is difficult to provide sufficient force for lifting. Obviously, it may be possible to increase the motor of the driving unit in order to solve this problem, but in this case, there is another problem in that the loss of volume in the refrigerator and noise are further increased, and the manufacturing cost is also increased.

The lifting mechanism supports a side of the entire bottom of the bin due to the position of the driving unit, so an eccentric load is unavoidably generated when objects are stored in the bin. A severe problem with safety may be caused by an eccentric load that is applied with the door drawn out, and there is also a problem in that elevation cannot be smoothly performed.

The lifting mechanism has a structure in which the whole bin is elevated. In order to elevate the bin, the bin has to be fully drawn out of the storage space of the refrigerator and has to be drawn out to a position where it does not interfere with an upper door and the refrigerator main body to prevent interference with elevation.

SUMMARY

The present disclosure provides a refrigerator in which an electric device for elevation is provided in a door unit and a mechanical device for elevating a drawer unit is provided in a drawer outside a door.

The present disclosure provides a refrigerator that improves an external appearance and safety by preventing exposure of components for elevating a drawer unit.

The present disclosure provides a refrigerator that can secure stable elevation by preventing a drawer unit from sinking due to an unbalanced load during elevation.

The present disclosure provides a refrigerator that enables an electric device and a mechanical unit for elevating a drawer unit to be separated when a door unit and a drawer unit are separated.

The present disclosure provides a refrigerator that enables a drawer door, which can be elevated, to be more conveniently assembled, can be more conveniently cleaned, and can more easily serviced.

The present disclosure provides a refrigerator that can provide a drawer structure that can be elevated with minimum loss in storage capacity.

The present disclosure provides a refrigerator that can minimize noise generation when a drawer is elevated.

A refrigerator according to one aspect includes: a cabinet having a storage space; a door including a door unit configured to open or close the storage space and a drawer unit configured to provide a receiving space; rails configured to connect the door and the cabinet to draw in or out the door; a driving device configured to be disposed at the door unit to provide power; and an elevation device configured to be disposed at the drawer unit and connected with the driving device to move up or down at the drawer unit.

The driving device may include: a motor assembly; a screw unit including a screw configured to be rotated by the motor assembly and a screw holder configured to move up or down along the screw; and a lever configured to connect the screw holder and the elevation device and rotate when the screw holder moves up or down.

The motor assembly may include: a driving motor; and a power transmission unit configured to transmit power from the motor to the screw unit.

The screw may be disposed to be inclined with respect to a vertical line. The screw may be disposed to be inclined with respect to a horizontal line.

The power transmission unit may transmit power downward from the driving motor and the screw may receive the power from the power transmission unit at a lower portion.

According to one aspect, the power transmission unit may include: a driving gear configured to be connected to the driving motor; one or more transmission gears configured to transmit power of the driving gear; a first helical gear unit configured to be connected to the one or more transmission gears; and a second helical gear unit configured to be coupled to a lower side of the screw and to be engaged with the first helical gear unit.

According to one aspect, a screw unit may be disposed at each of both sides of the motor assembly, a plurality of transmission gears may transmit power of the driving gear to the first helical gear unit, and a pair of first helical gears may be engaged with a final gear of the plurality of transmission gears.

According to one aspect, the pair of first helical gear units may be spaced apart from each other in a left-right direction, and the pair of first helical gear units may be engaged with the final gear with a rotational center thereof positioned lower than a rotational center of the final gear.

According to one aspect, the second helical gear unit may be connected to each of the first helical gear units, and shafts connected to the second helical gear unit may extend to go away from each other as they go upward.

According to one aspect, the final gear may be a spur gear, and the first helical gear unit may include a spur gear configured to be engaged with the final gear and a helical gear configured to extend from the spur gear of the first helical gear.

According to one aspect, a rotational center line of the first helical gear unit and a rotational center line of the second helical gear unit may cross each other.

As an example, the rotational center line of the first helical gear unit horizontally may extend and the rotational center line of the second helical gear unit extends in an up-down direction.

According to one aspect, the screw unit may include a housing configured to accommodate the screw, the housing may include: a first accommodating part configured to accommodate the screw; and a second accommodating part configured to accommodate the second helical gear unit, and may include a partition wall.

The second accommodating part may be positioned under the first accommodating part, and the screw may pass through the partition wall and the second helical gear unit may be coupled to the screw passing through the partition wall.

A portion of the first helical gear unit may be accommodated in the second accommodating unit and may be engaged with the second helical gear unit in the second accommodating unit.

According to one aspect, the screw unit may further include one or more guide bars configured to extend in parallel with the screw and guide movement of the screw holder.

The screw unit may include a plurality of guide bars, and the screw may be positioned between the plurality of guide bars.

According to one aspect, the motor assembly may include a motor case in which the driving motor is installed, the screw unit may include a housing configured to accommodate the screw, and the motor case and the housing may be integrally formed.

According to one aspect, the motor assembly may further include a driving motor configured to cover the driving motor installed in the motor case, and the power transmission unit may be positioned opposite the driving motor with the motor case therebetween. A single cover member may be coupled to the motor case and the housing to cover the power transmission unit and the screw.

According to one aspect, the elevation device may include: a lower frame configured to be fixed to the drawer unit; an upper frame configured to be disposed over the lower frame and to support food or one or more containers; and a scissor assembly in which a plurality of scissor frames connecting the upper frame and the lower frame are connected by a shaft.

The scissor assembly may be connected with the lever.

The scissor assembly may include an extending portion configured to pass through an opening of the drawer unit to be connected with the lever, and a coupling portion configured to extend from the extending portion.

The lever may include an accommodating portion configured to accommodate the coupling portion to be coupled to the coupling portion.

A refrigerator according to another aspect may include: a cabinet having a storage space; a door including a door unit configured to open or close the storage space and a drawer unit configured to provide a receiving space; rails configured to connect the door and the cabinet to draw in or out the door; a driving device configured to be disposed at the door unit to provide power; and an elevation device configured to be disposed at the drawer unit and connected with the driving device to move up or down at the drawer unit, in which the driving device may include: a motor assembly including a driving motor; a plurality of screw units including a screw configured to be rotated by the motor assembly and a screw holder configured to move up or down along the screw; and a plurality of levers configured to respectively connect the screw holders of the plurality of screw units and the elevation device and rotate when the screw holder moves up or down.

The screws of the plurality of screw units may be disposed such that extending lines thereof cross each other. Intersections of the screws may be positioned under the driving motor.

Advantageous Effects

It is possible to expect the following effects from refrigerators according to proposed embodiments.

A refrigerator according to an embodiment is configured such that a portion of a receiving space in a drawer door can be moved up and down with the drawer door drawn out. Accordingly, a user does not need to excessively bend over when putting food into the drawer door disposed at a lower position, so convenience of use can be improved.

In particular, in order to pick up heavy food or a container with food therein, a user has to exert a large force to pick up the food or the container, but the elevation device in the drawer door moves up to a position where use is made convenient by the driving device. Accordingly, there in an advantage in that it is possible to prevent an injury of a user and remarkably improve convenience in use.

The driving device that is configured as an electric device for providing power is disposed in the door unit and the elevation device has a structure disposed in the drawer unit, so both of the driving device and the elevation device are not exposed to the outside. Accordingly, safety in use can be secured and the external appearance can be improved.

In particular, since the driving device that is configured as an electric device is disposed in the door unit, it is possible to preclude an approach of a user. Accordingly, it is possible to expect an effect that can prevent occurrence of a safety accident.

Further, since the driving device is disposed in the door, noise is blocked, so there is an advantage in that it is possible to reduce noise during use.

Since the driving device that occupies a considerable part of the entire configuration is disposed at the door unit, it is possible to minimize a loss of storage capacity of the drawer unit. The elevation device has a structure that is folded into a compact size and accommodated when it is moved down, so there is an advantage in that it is possible to secure a large storage capacity in the refrigerator.

Since the driving device has screw units at both sides and provides power to both sides of the elevation device, there is an advantage in that it is possible to smoothly move up and down even heavy food or containers.

Since the screw units at both sides receive power from one motor, there is an advantage in that it is possible to secure horizontal moving up and down without biasing or sinking of the elevation device even without separate control or configuration.

Since the elevation device can be provided at a portion of the front parting of the drawer unit, it is possible to move up and down the elevation device without interference by the upper door or the cabinet even though the drawer unit is not drawn out such that it is fully exposed to the outside. Accordingly, there is an advantage in that it is possible to prevent sinking due to excessive drawing out of a heavy drawer door or a problem with durability, and it is possible to prevent a loss of cold air due to excessive drawing out of a drawer.

Further, since a structure in which not the entire, but a portion of the drawer is moved up and down, it is possible to make the entire moving up and down structure compact and also use a light structure. Accordingly, it is possible to minimize a loss of storage capacity and maintain a simple configuration.

Since the driving device is disposed in the door and the elevation device is disposed in the drawer, the driving device and the elevation device are precluded from being exposed to the outside in use. Accordingly, there is an advantage in that it is possible to remove a problem with safety and further improve the external appearance.

BRIEF DESCRIPTION OF DRAWINGS

FIG. 1 is a front view of a refrigerator according to an embodiment of the present invention.

FIG. 2 is a cross-sectional view schematically showing an elevated state of a lower drawer door of the refrigerator according to an embodiment of the present invention.

FIG. 3 is a perspective view showing a state when a container of the lower drawer door is separated.

FIG. 4 is an exploded perspective view seen from the front when a drawer unit and a door unit of the lower drawer door are separated.

FIG. 5 is a rear view of the door unit.

FIG. 6 is a rear view showing a state when a door cover of the door unit is removed.

FIG. 7 is a perspective view showing a state when a driving assembly and an elevation device are connected, from the front of the driving assembly.

FIG. 8 is a rear view showing a state when the driving assembly and the elevation device are connected, from the rear of the driving assembly.

FIG. 9 is a perspective view showing a state when the driving assembly and the elevation device are connected, from the rear of the driving assembly.

FIG. 10 is a partial enlarged view of the portion A of FIG. 9.

FIG. 11 is a perspective view of the drawer unit.

FIG. 12 is an exploded perspective view of FIG. 11.

FIG. 13 is a perspective view of an elevation device according to an embodiment of the present invention.

FIG. 14 is a view showing a state when an upper frame of the elevation device of FIG. 13 is moved up.

FIG. 15 is a view showing a state when a lever is connected with the elevation device.

FIG. 16 is a perspective view showing a state when the lower drawer door is closed.

FIG. 17 is a perspective view showing a state when the lower drawer door is fully open.

FIG. 18 is a cross-sectional view of the drawer door in a state when the container of the lower drawer door is fully moved down.

FIG. 19 is a cross-sectional view of the drawer door in a state when the container of the lower drawer door is fully moved up.

FIG. 20 is a rear view showing the driving device and the elevation device in a state when the container of the lower drawer door is fully moved up.

FIG. 21 is a perspective view showing a state of the driving device and the elevation device when the container of the lower drawer door is fully moved up.

FIG. 22 is a perspective view of a refrigerator according to another embodiment of the present invention.

FIG. 23 is a perspective view of a refrigerator according to another embodiment of the present invention.

FIG. 24 is a perspective view of a refrigerator according to another embodiment of the present invention.

DETAILED DESCRIPTION OF THE EMBODIMENTS

Hereinafter, embodiments of the present disclosure will be described in detail with reference to the accompanying drawings. It should be noted that when components in the drawings are designated by reference numerals, the same components may have the same reference numerals as far as possible even though the components are illustrated in different drawings. Further, in description of the embodiments of the present disclosure, when it is determined that detailed descriptions of well-known configurations or functions obscure the understanding of the embodiments of the present disclosure, the detailed descriptions may be omitted.

Also, in the description of the embodiments of the present disclosure, the terms such as first, second, A, B, (a) and (b) may be used. Each of the terms is merely used to distinguish the corresponding component from other components, and does not delimit an essence, an order or a sequence of the corresponding component. It should be understood that when one component is "connected", "coupled" or "joined" to another component, the former may be directly connected or jointed to the latter or may be "connected", coupled" or "joined" to the latter with a third component interposed therebetween.

FIG. 1 is a front view of a refrigerator according to an embodiment. FIG. 2 is a schematic view illustrating a state in which a lower drawer door of the refrigerator is withdrawn and elevated.

Referring to FIGS. 1 and 2, the refrigerator 1 may have a cabinet 10 defining a storage space and a door 2 covering an opened front surface of the cabinet 10.

The storage space of the cabinet 10 may be divided into a plurality of spaces. For example, an upper space of the cabinet 10 may be provided as a refrigerating compartment, and a lower space of the cabinet 10 may be provided as a freezing compartment. Each of the upper space and the lower space may be provided as an independent space that is maintained at a different temperature. The upper space and the lower space may be called an upper storage space 11 and a lower storage space 12.

The door 2 may comprise a rotation door 20 opening and closing the upper space through rotation thereof and a drawer door 30 opening and closing the lower space by being inserted or withdrawn with the drawer. The lower space may be horizontally divided again. The drawer door 30 may comprise an upper drawer door 30a and a lower drawer door 30b.

An outer appearance of each of the rotation door 20 and the drawer door 30 may be made of a metal material and be exposed to the front side.

Although the refrigerator in which all of the rotation door 20 and the drawer door 30 are provided is described, the present disclosure is not limited thereto. For example, the present disclosure may be applied to all refrigerators including a door that is inserted and withdrawn with the drawer.

The rotation door 20 is disposed at an upper position, so it can be referred to as an upper door, and the drawer door 30 is disposed at a lower position, so it can be referred to as a lower door.

A display 21 may be disposed on one side of a front surface of the rotation door 20. The display 21 may have a liquid crystal display structure or a 88 segment structure. Also, when the outer appearance of the rotation door 20 is made of the metal material, a plurality of fine holes are punched in the rotation door 20 to display information by using light passing therethrough.

A manipulation part 22 that is capable of manipulating automatic rotation or withdrawal of the upper door 20 or the lower door 30 may be provided on one side of the rotation door 20.

The manipulation part 22 may be integrated with the display 21 and may operate in a touch manner or a button manner. The manipulation part 22 may be used to input an overall operation of the refrigerator 1 and manipulate an insertion and withdrawal of the drawer door 30 or an elevation of a container within the drawer door.

A manipulation part 301 may also be provided on the drawer door 30. The manipulation part 301 may be disposed on one side of the lower drawer door 30b that is disposed at the lowermost portion of the drawer door 30. The manipulation part 301 may operate in a touch or button manner. The manipulation part 301 may be provided as a sensor detecting proximity or movement of a user or provided as an input unit that operates by a user's motion or voice.

As illustrated in the drawing, a manipulation device 302 may be disposed on a lower end of the lower drawer door 30b to illuminate an image on a bottom surface, and thereby output a virtual switch and input an operation when the user approaches the corresponding area.

The lower drawer door 30b may be automatically inserted and withdrawn according to the manipulation of the manipulation part 301. Also, food or a container 36 within the lower drawer door 30b may be elevated in a state in which the drawer door 30 is withdrawn by the manipulation of the manipulation part 301.

That is, the automatic insertion and withdrawal and/or automatic elevation of the lower drawer door 30b may be performed by at least one of a plurality of manipulation devices 22, 301, and 302. As necessary, only one of the plurality of manipulation devices 22, 301, and 302 may be provided in the refrigerator.

An inclined portion 311a may be formed at an angle at the lower portion of the front surface of the lower drawer door 30b and the manipulation device 302 may be mounted at the inclined portion 311a. The manipulation device 302 includes a projector light, which can output image, a proximity sensor, etc., so that it can project a virtual switch in an image type on a floor and can sense whether a user has selected the virtual switch through the proximity sensor.

Obviously, the manipulation device 302 may simply include only a proximity sensor. Automatic drawing-in and out and/or elevation of the lower drawer door 30b can be manipulated by manipulation of the manipulation device 302.

A manipulation device may be provided on the top surface of the lower drawer door 30b. When a manipulation device is provided on the top surface of the lower drawer door 30b, the manipulation device is not exposed to the outside, so the manipulation device cannot be manipulated when the lower drawer door 30b is closed. This manipulation device can be used to move up and down the lower drawer door 30b.

Meanwhile, since there are provided the manipulation devices 22, 301, and 302 and they can be used for drawing in and out and moving up and down the lower drawer door 30b, and drawing-in and out and moving-up and down can be manipulated in accordance with the manipulation combination of sequential manipulation of the plurality of manipulation devices 22, 301, and 302.

In order to retrieve food received in the lower drawer door 30b, it is possible to draw out forward the lower drawer door 30b and then move up the container 36 in the lower drawer door 30b.

On the other hand, the container 36 may have a predetermined height. Since the container 36 is seated on an elevation device 80 to be described below, when the elevation device 80 is moved up, the height of the container 36 can be added to the height of the elevation device 80. Accordingly, when the elevation device 80 is moved up, it may be positioned at a point where a user can easily approach the container 36 or lift the container 36.

Accordingly, the container 36 can be fully received in the drawer unit 32 when the lower drawer door 30b is drawn in and out, and when the elevation device 80 is moved up, it may be positioned at a higher position than the lower storage space 12.

Meanwhile, the shape of the container 36 is not limited, but may be a shape corresponding to the size of a front space (see S1 in FIG. 3). Further, it may be preferable that the container 36 is configured to have a predetermined height such that food received therein is not separated even though the elevation device 80 is moved up.

According to the present embodiment, it is possible to more easily lift and use the food or the container 36 in the drawer door 30 disposed at the lowermost position.

The lower drawer door 30b may be automatically drawn in and out forward and rearward by a drawing motor 14 and a pinion 141 disposed in the cabinet 10, and a drawing rack 34 disposed on the bottom surface of the lower drawer door 30b.

The container in the lower drawer door 30b can be moved up and down by the driving device 40 and the elevation device 80 disposed at the lower drawer door 30b.

Hereafter, the lower drawer door 30b and the configuration for operation of the lower drawer door 30b of the present embodiment are described in more detail, and unless specifically stated, the lower drawer door 30b is referred to as a "drawer door" or a "door".

Meanwhile, embodiments of the present invention are not limited to the number and shape of drawer doors and can be applied to all of refrigerators having a door that is drawn in and out in a drawer type at a lower storage space.

FIG. 3 is a perspective view showing a state when a container of the lower drawer door is separated. FIG. 4 is an exploded perspective view seen from the front when a drawer unit and a door unit of the lower drawer door are separated.

Referring to FIGS. 1 to 4, the door 30b may include a door unit 31 opening and closing the storage space and a drawer unit 32 coupled to the rear surface of the door unit 31 to be drawn in and out together with the door unit 31.

The door unit 31 is exposed outside the cabinet 1 and can form the external appearance of the refrigerator 1 and the drawer unit 32 is disposed in the cabinet 10 and can form a receiving space. The door unit 31 and the drawer unit 32 are combined with each other, so they can be drawn in and out forward and rearward together.

The drawer unit 32 is disposed on the rear surface of the door unit 31 and can form a space where food or a container to be stored is received. The inside of the drawer unit 32 may form a receiving space that is open upward, and the external appearance of the drawer unit 32 may be formed by a several plates (391, 392, and 395 in FIG. 12).

The several plates 391, 392, and 395 may be made of a metal material such as stainless steel and are disposed not only outside, but also inside the drawer unit 32 such that the entire drawer unit 32 has the texture of stainless steel or a texture like stainless steel.

A machine room 3 where a compressor, a condenser, etc., constituting a refrigeration cycle are disposed may be disposed behind the door 30 when the door 30 is drawn in. Accordingly, the rear portion of the drawer unit 32 may be formed in a shape in which the upper end protrudes rearward further than the lower end, and the rear surface of the drawer unit 32 may include an inclined surface 321.

Drawing rails 33 that can guide the door 30 being drawing in and out may be disposed on both sides of the drawer unit 32. The door 30 can be mounted on the cabinet 10 to be able to be drawn in and out by the drawing rails 33. The drawing rails 33 are covered by an outer side plate 391, whereby they are not exposed to the outside. The drawing rails 33 may be configured in a rail structure that can be stretched in multiple stages.

The drawing rails 33 may have a rail bracket 331 and the rail bracket 331 may extend to both sides of the drawer unit 32 from sides of the drawing rails 33. The rail bracket 331 may be coupled and fixed to a wall in the refrigerator. Accordingly, the drawer unit 32, that is, the door 30 can be mounted on the cabinet 10 to be able to be drawn in and out by the drawing rails 33.

Further, the drawing rails 33 may be disposed on the lower ends of both sides of the drawer unit 32, and accordingly, the drawing rails 33 may be understood as being disposed on the bottom surface of the drawer unit 32.

Accordingly, the drawing rails 33 are disposed on the lower ends of both sides of the drawer unit 32 and may be referred to as under rails.

A drawing rack 34 may also be disposed on the bottom surface of the drawer unit 32. The drawing rack 34 may be disposed on both left and right sides, and enables the door 30 to be automatically drawn in and out in cooperation with the drawing motor 14 mounted in the cabinet 10. That is, when manipulation is inputted through the manipulation parts 22 and 301, the drawing motor 14 is driven, so that the door 30 can be drawn in and out along the drawing racks 34. In this case, the door 30 can be stably drawn in and out by the drawing rails 33.

Obviously, the drawing rack 34 may not be disposed on the drawer unit 32 and the drawer unit 32 may be configured such that a user can draw the door 30 in and out in person by holding and pushing or pulling a side of the door unit 31.

Meanwhile, the inside of the drawer unit 32 may be divided into a front space S1 and a rear space S2. The elevation device 80 that is moved up and down and the container 36 that is seated on the elevation device 80 and moved together with the elevation device 80 may be disposed in the front space S1.

The container 36 is shown in a basket shape with an open top, but may have a closed box structure such as a Kimchi container, and several containers may be stacked or disposed in parallel.

When the door 30 is drawn out, the entire drawer unit 32 cannot be drawn out of the storage space due to a limitation in the drawing-out distance of the door 30. Further, at least the front space S1 is drawn out of the storage space and the entire or a portion of the rear space S2 is positioned in the storage space in the cabinet 1.

The larger the drawing-out distance of the door 30, the larger the moment that is applied to the door 30 when the door 30 has been drawn out, so it is difficult to maintain a stable state and the drawing rails 33 or the drawing racks 34 may be caused to be deformed or damaged. Accordingly, it is required to limit the drawing-out distance of the door 30.

The drawing-out distance of the door 30 may be limited by the drawing racks 34 or the drawing rails 33.

The elevation device 80 and the container 36 are accommodated in the front space S1 and the elevation device 80 can move up and down the food or the container 36 seated on the elevation device 80 while vertically moving up and down. The elevation device 80 may be disposed under the container 36, and when the container 36 is mounted, the elevation device 80 can be covered by the container 36. Accordingly, any of the components of the elevation device 80 is not exposed to the outside.

A separate drawer cover 37 may be disposed in the rear space S2. The front space S1 and the rear space S2 can be divided by the drawer cover 37. When the drawer cover 37 is mounted, the front surface and the top surface of the rear space S2 are covered such that a space that is not used is not exposed to the outside.

However, when the drawer cover 37 is separated, it is possible to access the rear space S2 and to put food into the rear space S2. In order to use the rear space S2, a separate pocket or a container corresponding to the shape of the rear space may be disposed in the rear space S2.

In order to use the entire space in the drawer unit 32, the elevation device 80 mounted in the drawer unit 32 can be simply separated, and it may be possible to use the entire internal space of the drawer unit 32 by separating the elevation device 80 and the drawer cover 37.

The external appearances of the inner side and the outer side of the drawer unit 32 may be formed by the plates (see 391, 392, and 395 in FIG. 12) and it may be possible to cover the components mounted in the drawer unit 32 so that the external appearances of the inside and outside can have a clean appearance. There may be provided several plates (see 391, 392, and 395 in FIG. 12) which may be made of a stainless material, thereby being able to provide a more luxurious and clean external appearance.

On the other hand, the door unit 31 and the drawer unit 32 that constitute the door 30 may have structures that can be combined with and separated from each other. It is possible to improve workability and to more conveniently service the door unit 31 and the drawer unit 32 through their separable structures.

The rear surface of the door unit 31 and the front surface of the drawer unit 32 can be coupled to each other, and when they are combined, the door unit 31 and the drawer unit 32 may be configured to be able to provide power for moving up and down the elevation device 80.

The driving device (see 40 in FIG. 6) for moving up and down the elevation device 80 may be disposed on the door unit 31, and the door unit 31 and the drawer unit 32 may be removably connected.

In particular, the driving unit (see 40 in FIG. 6) disposed on the door unit 31 may be composed of components that are operated by input power and components for transmitting power to the elevation device 80. Accordingly, when the driving unit (see 40 in FIG. 6) requires service, it is possible to take measures by separating the door unit 31 and it is possible to easily take measures by replacing only the door unit 31.

The door unit 31 and the drawer unit 32 may be combined by a pair of door frames 316 disposed on both sides of the door unit 31 and the drawer unit 32.

The door frame 316 may include a door coupling part 316a vertically extending and coupled to the door unit 31, and a drawer coupling part 316b extending rearward from the lower end of the door coupling part 316a.

The door coupling part 316a may be coupled to the door unit 31 by a separate coupling member and may be coupled to a side of the door unit 31 by a simple coupling structure. The drawer coupling part 316b is inserted in both sides of the drawer unit 32 and may be disposed adjacent to the drawing rails 33.

With the door coupling part 316a is coupled to the door unit 31, the drawer coupling part 316b can support the drawer unit 32 by being inserted in the drawer unit 32. The drawer coupling part 316b may be coupled to the drawer unit 32 by a separate coupling member or may be coupled by a shape-fitting structure at the drawer unit 32.

In order for the driving device 40 and the elevation device 80 to be connected when the door unit 31 and the drawer unit 32 are combined, a drawer opening 35 exposing a portion of the elevation device 80 may be formed on the front surface of the drawer unit 32.

Meanwhile, the door unit 31 is formed to be able to substantially open and close the storage space of the cabinet 10 and simultaneously form the front external appearance of the refrigerator 1.

The external appearance of the door unit 31 may be formed by an outer case 31 that forms the front surface and a portion of the circumferential surface, a door liner 314 that forms the rear surface, and an upper deco 312 and a lower deco 313 that form the top surface and the bottom surface.

The inside of the door unit 31 between the out case 311 and the door liner 314 may be filled with an insulator (not shown).

Hereafter, the door unit 31 constituting the door 30 and the driving assembly are described in more detail with reference to the drawings.

FIG. 5 is a rear view of the door unit. FIG. 6 is a rear view in a state when a door cover of the door unit is removed. FIG. 7 is a perspective view showing a state when a driving assembly and an elevation device are connected, from the front of the driving assembly.

FIG. 8 is a rear view showing a state when the driving assembly and the elevation device are connected, from the rear of the driving assembly and FIG. 9 is a perspective view showing a state when the driving assembly and the elevation device are connected, from the rear of the driving assembly. FIG. 10 is a partial enlarged view of the portion A of FIG. 9.

Referring to FIGS. 4 to 10, the front surface of the door unit 31 is formed by the outer plate 311 and the rear surface may be formed by the door liner 314.

The driving device 40 for operating the elevation device 80 may be disposed in the door unit 31. The driving device 40 is disposed in the door unit 31, but is not embedded in the insulator and is disposed in a space formed by the door liner 314, and may be covered by the door cover 315 so as not to be exposed to the outside.

In detail, the insulator may be disposed between the outer plate 311 and the door liner 314 and can insulate the inside of the storage space 12.

A plurality of door recessions that is recessed inward may be formed on the door liner 314. The door recessions may be formed in a shape corresponding to the shape of the driving device 40 and may be recessed toward the inside of the door 30.

The door cover 315, which forms the external appearance of the rear surface of the door unit 31, covers the driving device 40 mounted on the door unit 31.

The door cover 315 may be formed in a plate shape and can cover the driving device 40 such that the driving device 40 is not exposed when the driving device 40 is mounted.

The door cover 315 may have a cover recession formed at a corresponding position to be able to cover the driving device 40 from the rear. The cover recession may be formed such that the front surface of the door cover 315, that is, the surface facing the driving device 40 is recessed and the rear surface of the door cover 315, that is, the surface facing the inside of the storage space protrudes.

The side cut portions 315a may be formed at both left and right side end of the door cover 315. The side cut portions 315a, which are portions allowing a supporter 319 for coupling with the door frame 316 to be exposed, may be formed to be cut inward in a shape corresponding to the supporter 319.

The supporter 319 may be made of a metal material and may be firmly fixed and mounted to the rear surface of the door unit 31. The supporter 319 may be exposed at both sides of the rear surface of the door unit 31 and is firmly coupled to the door coupling part 316a of the door frame 316 such that the door unit 31 can be fixed and mounted to the drawer unit 32.

A door gasket 317 may be disposed around the rear surface of the door unit 31 and is in contact with the front surface of the cabinet 10 when the door 30 is closed, thereby being able to form a hermetic seal.

Meanwhile, the driving device 40 may be covered by the door cover 315 and may be disposed in the door unit 31. The power of the driving device 40 can be transmitted to the elevation device 80. In this configuration, the driving device 40 can transmit power simultaneously to both left and right sides of the elevation device 80 such that the elevation device 80 can be moved up and down with both left and right sides horizontally positioned without inclining or leaning to one side under any situation.

Hereafter, the components of the driving unit 40 are described in detail.

The driving device 40 may include a motor assembly 60, a pair of screw units 50 and 50*a* disposed at both sides of the motor assembly 60, and a pair of levers 42 respectively connected to the screw units 50 and 50*a*.

In detail, the motor assembly 60 may be positioned at the center portion of the door unit 31 in the left-right direction. By driving of the motor assembly 60 that includes a driving motor 64, the screw units 50 and 50*a*, and the levers 42 can be operated.

In particular, the motor assembly 60 can reduce a speed and adjust a force to be transmitted, through a combination of several gears.

Further, the motor assembly 60 may have a structure in which the driving motor 64 and the gears are vertically disposed in order to minimize a space that is recessed when it is mounted on the door unit 31, and particularly, may be formed such that the left-right width is large and the front-rear thickness is minimized to be able to minimize the thickness of the motor assembly 60.

Further, the driving motor 64 constituting the motor assembly 60 minimizes the recessed depth of the door unit 31 by protruding toward the drawer unit 32, thereby being able to secure insulation performance.

The driving motor 64, which provides power for moving up and down the elevation device 80, may be configured to rotate clockwise and counterclockwise. Accordingly, when an elevation signal for the elevation device 80 is inputted, it is possible to provide power for moving up and down the elevation device 80 by rotating clockwise or counterclockwise. It can be stopped when a load of the driving motor 64 or a stop signal inputted by a sensor is sensed.

The motor assembly 60 may include a motor case 61 in which the driving motor 64 is installed, and a motor cover 62 that is coupled to the motor case 61 and covers the driving motor 64.

A rotary shaft of the driving motor 64 may protrude from the motor case 61 to an opposite side of the motor cover 62.

The motor assembly 60 may further include a power transmission unit for transmitting the power of the driving motor 64.

The power transmission unit may be positioned opposite to the driving motor 64 with the motor case 61 therebetween.

The power transmission unit may include a driving gear 651 connected to the shaft of the driving motor 64 that passes through the motor case 61.

The power transmission unit may further include a first transmission gear 652 engaged with the driving gear 651 under the driving gear 651.

The first transmission gear 652, for example, may be a multi-stage gear. For example, the first transmission gear 652 may include a first gear 652*a* engaged with the driving gear 651 and a second gear 652*b* having a diameter smaller than the diameter of the first gear 652*a*. The first gear 652*a* and the second gear 652*b* each may be a spur gear.

The power transmission unit may further include a second transmission gear 653 engaged with the first transmission gear 652.

The second transmission gear 653 may be engaged with the first transmission gear 652 under the first transmission gear 652. The second transmission gear 653 may include a first gear 653*a* engaged with the second gear 652*b* of the first transmission gear 652, and a second gear 653*b* being smaller in diameter than the first gear 653*a*.

The first gear 653*a* and the second gear 653*b* of the second transmission gear 653 each may be spur gear. The first gear 653*a* of the second transmission gear 653 may be positioned under the first gear 652*a* of the first transmission gear 652. Accordingly, it is possible to prevent the front-rear width of the driving device 60 from being increased by the first transmission gear 652 and the second transmission gear 653.

The power transmission unit may further include a third transmission gear 654 engaged with the second transmission gear 653.

The third transmission gear 654 may be engaged with the second gear 653*b* of the second transmission gear 653 under the second gear 653*b*. The third transmission gear 654 may be a spur gear.

A portion of the third transmission gear 654 may be disposed to overlap the second transmission gear 653 in the front-rear direction.

In the present embodiment, the third transmission gear 654 may be referred to as a final gear that finally transmits the power of the plurality of transmission gears.

The motor case 61 may have a gear shaft that rotatably supports the plurality of transmission gears.

The power transmission unit may include a pair of first helical gear units 655 and 656 engaged with the third transmission gear 654.

The pair of first helical gear units 655 and 656 are spaced apart from each other in the left-right direction and may be engaged with the third transmission gear 654 with their rotational centers thereof lower than the rotational center of the third transmission gear 654.

In order that the first helical gear units 655 and 656 can be engaged with the third transmission gear 654, the first helical gear units 655 and 656 each may include a spur gear 655*a* and a helical gear 655*b* extending from the spur gear 655*a*.

The rotational center line of the first helical gear units 655 and 656 may horizontally extend.

The power transmission unit may further include a pair of second helical gear units 657 respectively engaged with the first helical gear units 655 and 656.

The second helical gear units 657 may be engaged with the helical gear 655*b*. The rotational center line of the second helical gear units 657 may vertically extend.

That is, the rotational center line of the first helical gear units 655 and 656 and the rotational center line of the second helical gear units 657 cross each other.

The rotational center line of the second helical gear units 657 may be inclined going away from the motor assembly 60 as it goes upward.

As described above, since a pair of crossing helical gears are used, there is the advantage in that it is possible to easily change the power transmission direction and the structure for power transmission is made compact.

The pair of screw units 50 and 50*a* may be disposed at both left and right sides of the motor assembly 60.

The pair of screw units 50 and 50*a* are disposed at respective left and right sides in the door unit 31 and the pair of screw units 50 and 50*a* are different only in the mounting position and are the same in structure and shape.

The power of the driving motor 64 can be transmitted from under the screw units 50 and 50a.

The screw units 50 and 50a at respective sides may be formed symmetrically with the motor assembly 60 therebetween. Accordingly, the motor assembly 60 may be disposed between the screw units 50 and 50a positioned at respective sides, and the screw units 50 and 50a disposed at the respective sides may be arranged such that the distance therebetween gradually decreases going to the lower end from the upper end of the screw units 50 and 50a.

The screw units 50 and 50a may include respective screws 52 and 52a that are rotated by the power transmitted from the driving motor 64. The screws 52 and 52a may be disposed to be inclined with respect to a vertical line. Further, the screws 52 and 52a may be disposed to be inclined with respect to a horizontal line.

The screws 52 and 52a vertically extend and may be inclined such that the upper ends face outward and the lower end face inward.

The screws 52 and 52a may be connected to the second helical gear units 657. That is, when the second helical gear units 657 is rotated, the screws 52 and 52a can also be rotated.

For example, an insert portion is formed at each second helical gear unit 657 and an accommodating groove in which the insert portion is accommodated may be formed at the screw 52, 52a.

Each screw units 50 and 50a may further include a screw holder 56 through which the screw 52, 52a is coupled.

The screw holder 56 can vertically move along the screw 52, 52a when the screw 52, 52a is rotated. The lever 42 may be coupled to the screw holder 56. When the screw holder 56 is moved, the lever 42 can be rotated.

A holder connector 562 may be coupled to the screw holder 56 through the lever 42. The lever 42 may have an oblong slot 426 so that the holder connector 562 is not interfered with when the lever 42 is rotated.

Since the screw units 50 and 50a are disposed at respective left and right sides, extension lines of the screw units 50 and 50a at respective left and right sides may cross each other outside the driving device 40. For example, the intersection of extension lines of the screws 52 and 52a may be positioned under the driving motor 64.

The lever 42 connects the screw holder 56 to the elevation device 80 and both ends thereof may be respectively coupled to the screw holder 56 and the elevation device 80.

The screw units 50 and 50a each may further include a housing 51 accommodating the screws 52 and 52a.

The housing 51 forms the outer shape of the screw units 50, 50a, has a space therein in which the screws 52, 52a and the screw holder 56 can be accommodated, and an open portion can be covered by a cover member 69 to be described below.

The housing 51 may be made of a plate-shaped metal material and bent, or may be made of a plastic material.

The housing 51 may include a first accommodating part 511 that accommodates the screws 52, 52a and a second accommodating part 512 that accommodates the second helical gear unit 657.

The first accommodating part 511 and the second accommodating part 512 may be divided by a partition wall 513. The second accommodating part 512 is positioned under the first accommodating part 511.

A portion of the first helical gear unit 655, 656 may be accommodated in the second accommodating part 512. That is, the first helical gear unit 655, 656 and the second helical gear unit 657 may be connected in the second accommodating part 512.

The lower portion of the screw 52, 52a passes through the partition wall 513 and the second helical gear unit 657 is coupled to the screw 52, 52a passing through the partition wall 513.

The housing 51 may have one or more guide bars 53 and 54 for guiding the upward movement of the screw holder 56. The one or more guide bars 53 and 54 are spaced apart from the screw 52, 52a and extend in parallel with the screw 52, 52a.

In order to prevent the screw holder 56 from inclining to any one of the left and right sides from the screw 52, 52a, the housing 51 has a plurality of guide bars 53 and 54 and the screw 52, 52a may be positioned between the plurality of guide bars 53 and 54.

The motor case 61 and the pair of housings 51 may be integrally formed. A single cover member 69 can cover the motor case 61 and the pair of housings 51.

That is, the cover member 69 is fastened to the motor case 61, thereby being able to cover the power transmission unit, and is fastened to the pair of housings 51, thereby being able to cover the screws 50 and 50a, the guide bars 53 and 54, and the screw holder 56.

According to the present embodiment, since the driving device 40 exists in a one module type, the driving device 40 is made compact, so it is possible to easily install the driving device 40 at the door unit 31.

Further, since the single cover member 69 covers both of the motor case 61 and the pair of housings 51, when the cover member 69 is separated, it is possible to easily approach the power transmission unit or the inside of the housings 51, so there is the advantage in that it can be easily serviced.

FIG. 11 is a perspective view of the drawer unit and FIG. 12 is an exploded perspective view of the drawer unit of FIG. 11.

Referring to FIGS. 3, 11, and 12, the drawer unit 32 may include a drawer main body 38 forming the entire shape of the drawer unit 32, the elevation device 80 disposed in the drawer main body 38 and being able to move up and down the container and food, and several plates 391, 392, and 395 forming the internal and external appearances of the drawer unit 32.

In detail, the drawer main body 38 may be made of a plastic material by injection molding and forms the entire shape of the drawer unit 32. The drawer main body 38 has a basket shape with an open top and has a receiving space therein for food. The rear surface of the drawer main body 38 may be an inclined surface 321, thereby being able to prevent interference with the machine room 3.

The door frames 316 may be mounted on both sides of the drawer unit 32. The door frames 316 may be coupled to frame mounts 383 on both sides of the bottom surface or at the lower portions of left and right sides of the drawer unit 32. When the door frames 316 are coupled to the drawer unit 32, the drawer unit 32 and the door unit 31 are integrally combined to be able to be drawn in and out together.

The door frame 316 and the drawer unit 32 may be coupled to each other by a coupling structure using a separate coupling member or a shape-fitting structure between the door frame 316 and the drawer unit 32.

The drawing racks 34 may be disposed on left and right sides of the bottom surface of the drawer unit 32. The drawer unit 32 can be drawn in and out in the front-rear direction by the drawing racks 34. In detail, when the drawer unit 32 is mounted on the cabinet 10, at least a portion thereof is positioned in the storage space. The drawing racks 34 may be coupled to the pinion gears 141 disposed on the floor surface of the storage space. Accordingly, when the drawing motor 14 is driven, the pinion gears 141 are rotated, so the drawing racks 34 can be moved and the door 30 can be drawn in and out.

Obviously, in the case the door 30 is not automatically drawn in and out and a user draws the door 30 in and out by pushing and pulling it, the drawing racks 34 are omitted and drawing-in and out may be guided only by the drawing rails 33.

The rail mounts 382 where the drawing rails 33 for guiding the drawer main body 38 being drawn in and out may be formed at the lower portions of both sides of the drawer main body 38. The rail mounts 382 extend from the front end to the rear end and may have a space therein in which the drawing rails 33 can be accommodated.

The drawing rails 33, which can be multi-stage stretching rails, may have an end fixed in the storage space in the cabinet 10 and the other end fixed to the rail mount 382 such that the door 30 can be more stably drawn in and out.

The several plates 391, 392, 395 made of a metal material such as stainless steel and having a plate shape form at least a portion of the internal and external appearances of the drawer main body 38.

In detail, outer side plates 391 may be disposed on left and right outer sides of the drawer main body 38. The outer side plates 391 are mounted on left and right sides of the drawer main body 38, thereby forming the external appearance of the both sides, and particularly, being able to prevent exposure of components such as the door frames 316 and the drawing rails 33 mounted on both sides of the drawer main body 38.

Several reinforcing ribs 384 may be formed on left and right outer sides of the drawer main body 38 to cross each other transversely and longitudinally. The reinforcing ribs 384 can enable the drawer main body 38 to more firmly maintain the shape against the weight of the door increased due to the driving device 40 and the elevation device 80 by increasing the strength of the drawer main body 38 itself.

The reinforcing ribs 384 can support the outer side plates 391 mounted on both sides, thereby enabling the external appearance of the drawer unit 32 to be firmly maintained.

Inner side plates 392 may be disposed on left and right inner sides of the drawer main body 38. The inner side plates 392 are mounted on left and right sides of the drawer main body 38 and may form the left and right inner sides.

The inner plate 395 may include a front surface portion 395a, a bottom surface portion 395b, and a rear surface portion 395c that have sizes and shapes corresponding to those of the inner front surface, bottom surface, and rear surface of the drawer main body 38.

The inner plate 395 may be formed by bending a plate-shaped stainless material to be able to form the other inner sides except for the left and right sides of the drawer main body 38. Both left and right side ends of the inner plate 395 may be in contact with the inner side plates 392. Obviously, the front surface portion 395a, the bottom surface portion 395b, and the rear surface portion 395c that constitute the inner plate 395 may be separately formed and then coupled or bonded to each other.

By the inner side plates 392 and the inner plate 395, all of the inner sides of the drawer main body 38 can be formed and the inner sides of the drawer main body 38 can provide a metallic texture.

Accordingly, the entire receiving space in the drawer unit 32 can have a metallic texture, the food received therein can be uniformly kept cool throughout the entire area, and excellent cooling performance and storing performance can be provided to a user.

The drawer cover 37 may include a cover front surface portion 371 dividing the inside of the drawer main body 38 into the front space S1 and the rear space S2, and a cover top surface portion 372 bending from the upper end of the cover front surface portion 371 and covering the top surface of the rear space S2.

That is, when the drawer cover 37 is mounted, only the front space S1 in which the elevation device 80 is disposed may be exposed in the drawer main body 38 and the rear space S2 may be covered by the drawer cover 37.

On the other hand, the elevation device 80 may be disposed in the drawer main body 38. The elevation device 80 has a structure connected with the driving device 40 to be able to move up and down, and both left and right sides may be uniformly moved up and down.

In order to couple the elevation device 80 and the driving device 40, a drawer opening 35 is formed at the lower portion of the front surface of the drawer 32.

Meanwhile, the elevation device 80 may be configured in a scissors type such that it is folded when it moves down, and it is unfolded when it is moved up so that the container or food seated on the top surface thereof is moved up and down.

The elevation device 80 may include a support plate 81 and the support plate 81 can provide a seating surface for the container 36 or a surface on which food is seated.

Meanwhile, the height of the drawer opening 35 may be at a position lower than the upper end of the elevation device 80, that is, the top surface of the support plate 81. Accordingly, when the elevation device 80 is mounted, it is possible to prevent the drawer opening 35 to be shown inside the drawer unit 32 in any states.

In addition, the support plate 81 has a size and a shape corresponding to the front space, thereby being able to prevent dirt from permeating into the elevation device 80 disposed under the front space S1 and to preclude a safety accident by blocking approach to the elevation device 80.

FIG. 13 is a perspective view of an elevation device according to an embodiment of the present invention, FIG. 14 is a view showing a state when an upper frame of the elevation device of FIG. 13 is moved up, and FIG. 15 is a view showing a state when a lever of the present embodiment is connected with the elevation device.

Referring to FIGS. 13 to 15, the elevation device 80 may be disposed on the floor inside the drawer unit 32 and may be detachably provided in the drawer unit 32.

The elevation device 80 may include an upper frame 82, a lower frame 83, and a scissor assembly 84 disposed between the upper frame 82 and the lower frame 83.

In detail, the upper frame 82 is formed in a rectangular frame shape corresponding to the size of the front space S1 in the drawer unit 32 and the support plate 81 may be seated on the top thereof.

The upper frame 82 is a part of the elevation device 80, which is vertically moved and substantially supports food or the container 36 together with the support plate 81.

The upper frame 82 may include a frame part 821 forming the entire circumference of the upper frame 82, and a partition part 822 dividing the space inside the frame part 821 into left and right sections.

The frame part 821 and the partition part 822 are configured to form an external frame and support the support plate 81, so their strength is high. Accordingly, the frame part 821 and the partition part 822 may be made of a metal material and may have a shape of which both ends are bent to further increase the strength and prevent deformation.

A slide guide 824 in which an end of the scissor assembly 84 is received and that guides movement of the scissor assembly 84 may be disposed on the bottom surface of the frame part 821.

The scissor assembly 84 may be disposed in each of spaces 823 and 824 at both sides from the partition part 822.

The slide guide 824 may define an oblong hole 824a through which the scissor assembly 84 can pass. Accordingly, the scissor assembly 84 can be moved along the slide guide 824.

The lower frame 83 is different only in direction from the upper frame 82 and may have a structure the same as or similar to that of the upper frame 82.

The lower frame 83 may include a frame part and a partition part. Further, a slide guide 834 in which an end of the scissor assembly 84 is received and that guides movement of the scissor assembly 84 may be disposed on the top surface of the lower frame 83.

The slide guide 834 may define an oblong hole 834a through which the scissor assembly 84 can pass. Accordingly, the scissor assembly 84 can be moved along the slide guide 834.

The scissor assembly 84 may be disposed at each of left and right sides, and the scissor assemblies 84 at the left and right sides are operated by power transmitted from the driving motor 64, so that they can be simultaneously moved at the same height.

Accordingly, when a heavy load is supported, the load can be effectively moved up by a pair of the scissor assemblies 84 to which force is independently applied at both sides, and in this case, the scissor assemblies 84 can be moved up and down with the upper frame 82, that is, the support plate 81 in a horizontal state.

The scissor assemblies 84 may include a first scissor frame 841 having a rectangular frame shape and a second scissor frame 845 having a rectangular frame shape and rotatably connected to the first scissor frame 841.

The left-right width of the second scissor frame 845 may be formed smaller than the left-right width of the first scissor frame 841. Accordingly, the second scissor frame 845 may be connected with the first scissor frame 841 when it is positioned in an area formed by the first scissor frame 841.

The first scissor frame 841 may include a lower shaft (841a in FIG. 21) and an upper shaft (841b in FIG. 21) that horizontally extend.

The lower shaft (841a in FIG. 21) is rotatably supported by the lower frame 83 and the upper shaft (841b in FIG. 21) is disposed through the sliding guide 824 of the upper frame 82.

The first scissor frame 841 may further include a pair of first rods (842a in FIG. 21) that vertically extend.

The second scissor frame 845 may include a lower shaft 851a and an upper shaft (not shown) that horizontally extend, and a pair of second rods 852a and 852b that vertically extend.

Any one of the pair of first rods 842a of the first scissor frame 84 may include an extension 842b protruding to be connected with the lever 42, and a coupling portion 842c formed at an end of the extension 842b.

The lever 42 may include an accommodating part 421a that accommodates the coupling portion 842c and be coupled to the coupling portion 842c.

The end of the coupling portion 842c may be formed in a non-circular shape. Accordingly, when the lever 42 is rotated with the coupling portion 842c accommodated in the accommodating part 421a, the lever 42 can be prevented from idling with respect to the coupling portion 842c.

The coupling portion 842c and the extension 842b may pass through the drawer opening 35 and the extension 842b may be positioned over the drawer opening 35. Accordingly, the elevation device 80 in the drawer unit 32 can be connected with the driving device 40 outside the drawer unit 32 by the extension 842b and the coupling portion 842c.

Hereafter, the door 30 of the refrigerator 1 having the above-mentioned structure according to an embodiment of the present invention is described in more detail with reference to the drawings.

FIG. 16 is a perspective view showing a state when the lower drawer door is closed.

Referring to FIG. 16, when food is kept in the refrigerator 1, both of the rotation door 20 and the door 30 are closed. In this state, a user can draw out the door 30 and put food inside.

A plurality of doors 30 may be provided up and down and can be drawn out and opened by manipulation of a user.

The manipulation of the user may be performed by touching the manipulation part 301 disposed on the front surface of the rotation door 20 or the door 30, or opening manipulation by the manipulation device 302 disposed at the lower end of the door 30 may be possible.

The manipulation part 301 and the manipulation device 302 may be configured to respectively individually draw in and out the door 30 and move up and down the elevation device 80. Obviously, a user can also open the door 30 with the handle of the door 30 held by hand.

It is exemplified hereafter that a lower drawer door 30b of the doors 30 disposed up and down is opened and moved up and down, but both of the upper and lower doors 30 may be drawn in and out and moved up and down in the same manner.

FIG. 17 is a perspective view showing a state when the lower drawer door is fully open and FIG. 18 is a cross-sectional view of the drawer door in a state when the container of the drawer door is fully moved down.

Referring to FIGS. 17 and 18, when a user draws out the lower drawer door 30b, the lower drawer door 30b is drawn forward. The lower drawer door 30b can be drawn out while the drawing rails 33 are stretched.

Meanwhile, the lower drawer door 30b may be configured not in the manner in which a user opens the lower drawer door 30b by pulling it in person, but drawn out by driving of the drawing motor 14.

The drawing racks 34 disposed on the floor surface of the lower drawer door 30b may be coupled to the pinion gears 141 that are rotated when the drawing motor 14 disposed on the cabinet 10 is driven, and accordingly, the lower drawer door 30b is drawn in and out by driving of the drawing motor 14.

The drawing in and out distance of the lower drawer door 30b may be a distance where at least the front space S1 in the drawer unit 32 can be fully exposed to the outside. Accordingly, in this state, when the elevation device 80 is moved up and down, the container or food is not interfered with by the doors 20 and 30 or the cabinet 10.

In this case, the drawing in and out distance of the lower drawer door 30b may be determined by a drawing sensing device 15 disposed on the cabinet 10 and/or the lower drawer door 30b.

The drawing sensing device 15 may be configured as a sensor that senses a magnet 389, thereby being able to sense the state when the lower drawer door 30b is fully drawn out or closed.

For example, as shown in the figures, the magnet 389 may be disposed on the floor of the drawer unit 32 and the sensor may be disposed on the cabinet 10. The drawing sensing device 15 may be disposed at positions corresponding to the position of the magnet 389 when the lower drawer door 30b is closed and corresponding to the position of the magnet 389 when the lower drawer door 30b is fully drawn out. Accordingly, it is possible to determine the drawing in and out state of the lower drawer door 30b using the drawing sensing device 15.

Alternatively, switches may be disposed at positions where the lower drawer door 30b is fully drawn in and drawn out, thereby being able to sense drawing-in and out of the lower drawer door 30b. Further, it may be possible to sense drawing in and out of the lower drawer door 30b using a sensor that counts the number of revolutions of the drawing motor 14 or measures the distance between the rear surface of the door unit 31 and the front end of the cabinet 10.

When the lower drawer door 30b is fully drawn out, the driving motor 64 is driven and the elevation device 80 can be operated. The elevation device 80 may be configured to operate in a situation in which the lower drawer door 30b is sufficiently drawn out and food or the container 36 seated on the elevation device 80 can be safely moved up and down.

That is, when the lower drawer door 30b is drawn out and the front space S1 is fully exposed to the outside, the elevation device 80 is operated such that the container 36 or stored food seated on the elevation device 80 is not interfered with by other doors 20 and 30 or the cabinet 10.

The state when the lower drawer door 30b is drawn out is described in more detail. When the lower drawer door 30b is drawn out for the elevation device 80 to be moved up, the front space S1 has to be fully drawn out of the lower storage space 12.

In particular, the rear end L1 of the front space S1 has to be drawn out further than the cabinet 10 or the front end L2 of the upper door 20. Further, in order to prevent interference when the elevation device 80 is moved up and down, the rear end L1 has to be able to be positioned further forward than at least the cabinet 10 or the front end L2 of the upper door 20.

When the elevation device 80 is drawn out to be driven, the drawer unit 32 may be drawn out not entirely and fully, but only to a position for avoiding interference when the elevation device 80 is moved up and down, as shown in FIG. 18. In this case, at least a portion of the rear space S2 of the drawer unit 32 is positioned in the lower storage space 12. That is, the rear end L3 of the drawer unit 32 is positioned at least in the lower storage space 12.

Accordingly, even in a state when not only the weight of the lower drawer door 30b including the driving device 40 and the elevation device 80, but the weight of the received objects are added, it is possible to secure stable drawing-in and out and up-down movement without the drawing rails 33 or the lower drawer door 30b itself from sinking or being damaged.

The elevation device 80 may start to be moved up after full drawing out of the lower drawer door 30b is determined. In order to secure safety of a user and prevent damage of the stored food, the elevation device 80 may be configured to start to be operated when a set time passes after drawing out of the lower drawer door 30b is determined.

Obviously, after the lower drawer door 30b is drawn out, a user may directly input operation of the elevation device 80 by manipulating the manipulation part 301. That is, it is possible to manipulate the manipulation part 301 in order to draw out the door 30 and it is also possible to manipulate again the manipulation part 301 in order to operate the elevation device 80.

A user may manually draw out the lower drawer door 30b and then manipulate the manipulation part 301 to operate the elevation device 80.

Meanwhile, until the lower drawer door 30b is fully drawn out, as shown in FIG. 18, the driving device 40 and the elevation device 80 are not operated and the elevation device 80 is maintained at the lowest position.

FIG. 19 is a cross-sectional view of the drawer door in a state when the container of the lower drawer door is fully moved up.

As shown in FIG. 19, when the lower drawer door 30b has been drawn out and an operation signal of the driving device 40 is inputted, the driving device 40 is operated and the elevation device 80 is moved up, whereby the state shown in FIG. 19 is obtained.

In the present embodiment, moving up of the elevation device 80 means that the upper frame 82 is moved up by the scissor assemblies 84 and moving-down of the elevation device 80 means that the upper frame 82 is moved down by the scissor assemblies 84.

Since the driving device 40 is connected with the elevation device 80, it is a state in which power can be transmitted to the elevation device 80. Upon starting to operate the driving device 40, power is transmitted to the elevation device 80 and the elevation device 80 starts to moved up.

Meanwhile, the elevation device 80 is continuously moved up, and is stopped when it is moved up to a position that is high enough to easily approach food or the container 36 seated on the elevation device 80, as shown in FIG. 19. In this state, a user can easily pick up the food or the container 36 even without excessively bending over.

When an elevation completion signal of the elevation device 80 is inputted, driving of the driving motor 64 is stopped. To this end, a height sensing device (not shown) that can sense the position of the elevation device 80 may be provided. The height sensing device is disposed on the door unit 31 and may be disposed at a position corresponding to the maximum height of the elevation device 80 and a position corresponding to the minimum height of the elevation device 80.

The height sensing device may be configured as a sensor that senses the magnet 389 and can determine whether the elevation device 80 has finished being moved up by sensing the magnet 389 disposed on the elevation device 80. The height sensing device may be configured as a switch structure such that a switch is turned on when the elevation device 80 is maximally moved up.

Alternatively, the height sensing device may be disposed on the screw units 50 and 50a to be able to sense the moved-up position of the screw holder 56. It may be possible to determine whether the elevation device 80 has been maximally moved up on the basis of a change in load that is applied to the driving motor 64.

Meanwhile, when the elevation device 80 has been maximally moved up, the driving motor 64 is stopped. In this state, the elevation device 80 is positioned in the drawer unit 32, but the food or the container 36 seated on the elevation device 80 is positioned higher than the open top surface of the drawer unit 32, so a user can easily approach it.

In particular, since a user does not need to excessively bend over to pick up the container 36, more safe and convenient work is possible.

The state in which the elevation device 80 has been maximally moved up is described in more detail. The elevation device 80 is moved up by driving of the driving device 40 and is positioned at least lower than the upper end of the drawer unit 32.

The container 36 is seated on the elevation device 80, and as for the container 36, the upper end H1 of the container 36 may be moved up higher than the upper end H2 of the lower storage space 12. The height in this case is a height that enables a user to stretch their hands and pick up the container 36 without bending over, which may be a height that is most suitable for use.

That is, the driving device 40 has a structure that is moved up in the drawer unit 32, but when the container 36 is seated on the elevation device 80, the container 36 can be positioned at a height that a user can easily approach.

After a user finishes putting food in the refrigerator, the user can move down the elevation device 80 by manipulating the manipulation part 301. Moving down of the elevation device 80 can be achieved by backward rotation of the driving motor 64 and may be slowly performed through a reverse process of the process described above.

When the elevation device 80 finishes being moved down, the state shown in FIG. 18 is made, and completion of moving down of the elevation device 80 may be made by the height sensing device. The height sensing device may be further provided at a corresponding position to be able to sense the magnet disposed on the elevation device 80 when the elevation device 80 is positioned at the lowermost position. Accordingly, when completion of moving down of the elevation device 80 is sensed, the driving device 40 is stopped.

After the driving motor 64 is stopped, the lower drawer door 30b can be drawn in. In this case, the lower drawer door 30b may be closed manually by the user or may be closed by driving of the drawing motor 14. When the lower drawer door 30b is fully closed, the state shown in FIG. 16 may be obtained.

FIG. 20 is a rear view showing the driving device and the elevation device in a state when the container of the lower drawer door is fully moved up and FIG. 21 is a perspective view showing a state of the driving device and the elevation device in the state when the container of the lower drawer door is fully moved up.

Referring to FIGS. 18 to 21, the driving motor 64 is rotated forward or backward by a moving-up or a moving-down signal of the elevation device 80.

As for the reference of the operation of the elevation device 80 moving up, the driving gear 651 is rotated by driving of the driving motor 64. Torque of the driving motor 64 is transmitted to the first helical gear units 655 and 656 through the first to third transmission gears 652, 653, and 654 by rotation of the driving gear 651.

The second helical gear units 657 connected to the first helical gear units 655 and 656 are rotated by the first helical gear units 655 and 656, thereby changing the power transmission direction. The screws 52 and 52a connected with the second helical gear units 657 are rotated.

In this case, the same torque is transmitted to the screws 52 and 52a, and the screw holders 56 are simultaneously moved up to the same height.

As the screw holder 56 is moved up, the lever 42 connected to the screw holder 56 is rotated. As the lever 42 connected to the screw holder 56 is rotated, the height of the lever 42 increases. Further, as the height of the lever 42 increases, the height of the first rod 842a of the first scissor frame 84 connected with the lever 42 increases.

As the height of the first rod 842a of the first scissor frame 84 increases, the scissor assembly 84 can be unfolded.

As a result, as the scissor assembly 84 is unfolded, the upper frame 82 is moved up, the food or the container 36 seated on the elevation device 80 is moved up, and the elevation device 80 is moved up to the maximum height, as shown in FIG. 19.

In this state, the driving device 40 is stopped, and when a user inputs manipulation to move down the elevation device 80 after putting food into the refrigerator, the driving motor 64 is rotated backward. The elevation device 80 is moved down by a reverse process of the process described above, and the state shown in FIG. 18 can be obtained.

Meanwhile, the present invention may be achieved by various embodiments other than the embodiment described above.

Hereafter, other embodiments of the present invention are described with reference to the drawings. In other embodiments of the present invention, the same components as those in the previous embodiment may be given the same reference numerals and may not be described and shown in detail.

FIG. 22 is a perspective view of a refrigerator according to another embodiment of the present invention.

Referring to FIG. 22, a refrigerator according to another embodiment of the present invention may include a cabinet 1 having a storage space partitioned up and down, and a door configured to open and close the storage space.

The door may include a rotation door 20 disposed at the upper portion of the front surface of the cabinet 10 to open and close the upper storage space and a door 30 disposed at the lower portion of the front surface of the cabinet 10 to open and close the lower storage space.

The door 30 can be drawn in and out forward and rearward, as in the previous embodiment, and may have a structure in which when the door 30 is drawn out, a container and food in the drawer unit 32 can be moved up and down by operations of the driving device 40 and the elevation device 80 in the door 30.

The elevation device 80 may be disposed in the area of a front space in the drawer unit 32, and accordingly, food can be moved up and down by the elevation device 80 in the area of the front space of the entire area of the drawer unit 32.

A manipulation part 301 or a manipulation device 302 may be disposed at a side of the door unit 31, and the driving device 40 may be disposed in the door unit 31. By manipulation of the manipulation part 301 or a manipulation device 302, the drawer door 30 can be drawn in and out and/or the elevation device 80 can be moved up and down.

The elevation device 80 is disposed at the drawer unit 32 and can be moved up and down by the driving device. The configuration of the drawer door 30 and the configuration of the driving device 40 and the elevation device 80 can be the same as those described in the previous embodiment, so detailed description is omitted.

A plurality of containers 361 may be disposed on the elevation device 80. The containers 361 may be sealed containers such as a Kimchi container, and several containers can be seated on the elevation device 80. The containers 361 may be moved up and down together when the elevation device 80 is moved up and down.

Accordingly, at least a portion of the container 361 may protrude upward from the drawer unit 32 when it is moved up, and a user can easily pick up the container 361.

Meanwhile, even though the drawer door 32 is drawn out, the elevation device 80 may interfere with the rotation door 20 when the rotation door 20 is open, so the elevation device 80 is configured to be able to move up when the rotation door 20 is closed. To this end, a door switch for sensing the opening and closing of the rotation door 20 may be further provided.

FIG. 23 is a perspective view of a refrigerator according to another embodiment of the present invention.

Referring to FIG. 23, a refrigerator according to another embodiment of the present invention may include a cabinet 1 having a storage space, and a door configured to open and close an open front surface of the cabinet 1.

The door forms the external appearance of the front surface of the refrigerator 1 and may be configured as a drawer door 30 that is drawn forward and rearward. Several drawer doors 30 may be continuously disposed up and down. Each of the drawer doors 30 may be independently drawn in and out by manipulation of a user, and a driving device 40 and an elevation device 80 may be disposed in the drawer door 30.

The driving device 40 may be disposed at the door unit 31 and the elevation device 80 may be disposed in the drawer unit 32. When the door unit 31 and the drawer unit 32 are combined, the driving device 40 and the elevation device 80 are connected to each other, whereby power can be transmitted.

Further, the elevation device 80 may be disposed in a front space S1 of the entire storage space of the drawer unit 32.

The drawer door 30 and the elevation device 80 may be individually drawn in and out and moved up and down, respectively. Further, moving up of the elevation device 80 after the drawer door 30 is drawn out, and drawing in of the drawer door 30 after the elevation device 80 is moved down may be continuously performed.

When a plurality of drawer doors 30 is disposed up and down, the elevation device 80 in a drawer door 30 disposed at a relatively low position is not moved up when a drawer door 30 disposed at a relatively high position is drawn out, whereby it is possible to prevent stored food and a container from interfering with the drawer door 30 drawn out at a relatively high position.

Although an example in which the elevation device 80 has been moved up with the drawer door 30 at the lowermost position drawn out, all of the drawer doors 30 disposed at higher positions can be configured such that they are drawn out and then the elevation devices 80 therein can be moved up and down.

Obviously, if the heights of the drawer doors 30 disposed at higher positions are sufficiently high, only the drawer door 30 at the lowermost position or the drawer doors 30 at relatively higher positions than the lowermost position may have a structure that can be moved up and down.

FIG. 24 is a perspective view of a refrigerator according to another embodiment of the present invention.

As shown in the figure, a refrigerator according to another embodiment of the present invention may include a cabinet 1 having a storage space, and a door configured to open and close an open front surface of the cabinet 1.

The storage device in the cabinet 10 may be partitioned up and down, and if necessary, the upper and lower storage device may be partitioned again to the left and right.

The door may be composed of a rotation door 20 disposed at the upper portion the cabinet 10 and rotatably mounted to open and close the upper storage space and a door 30 disposed at the lower portion of the cabinet 10 and mounted to be able to be drawn in and out to open and close the lower storage space.

The lower space of the cabinet 10 may be partitioned left and right and the drawer door 30 may be provided in pairs to be able to open and close the partitioned lower spaces, respectively. The drawer door 30 is disposed in pairs in parallel at both left and right sides, and a driving device 40 and an elevation device 80 may be disposed in the drawer door 30.

The driving device 40 may be disposed at the door unit 31 and the elevation device 80 may be disposed in the drawer unit 32. When the door unit 31 and the drawer unit 32 are combined, the driving device 40 and the elevation device 80 are connected to each other, whereby power can be transmitted. Further, the elevation device 80 may be disposed in a front space S1 of the entire storage space of the drawer unit 32.

The drawer door 30 has the same configuration as the previous embodiments and may be drawn in and out by manipulation of a user. Further, the elevation device 80 is moved up when the drawer door 30 is drawn out, so a user can more conveniently approach food or containers in the drawer door 30.

What is claimed is:

1. A refrigerator comprising:
   a cabinet having a storage space;
   a door including a door unit to open or close the storage space and a drawer unit to provide a receiving space;
   rails to connect the door and the cabinet, and through which the door is drawn in or out of the cabinet;
   a driving device disposed at the door unit to provide power; and
   an elevation device disposed at the drawer unit and connected with the driving device to move the drawer unit up or down,
   wherein the driving device includes:
   a motor assembly;
   a screw unit including a screw to be rotated by the motor assembly and a screw holder to move up or down along the screw; and
   a lever to connect the screw holder and the elevation device, and to rotate when the screw holder moves up or down; and
   the motor assembly includes:
   a driving motor; and
   a power transmission unit to transmit the power from the motor to the screw unit, and the screw is disposed to be inclined with respect to a vertical line passing in a top-bottom direction of the refrigerator.

2. The refrigerator of claim 1, wherein the screw is disposed to be inclined with respect to a horizontal line.

3. The refrigerator of claim 1, wherein the power transmission unit transmits the power downward from the driving motor and the
   screw receives the power from a lower portion of the power transmission unit.

4. The refrigerator of claim 1, wherein the power transmission unit includes:
   a driving gear connected to the driving motor;
   one or more transmission gears to transmit the power from the driving gear;
   a first helical gear unit connected to the one or more transmission gears; and
   a second helical gear unit coupled to a lower side of the screw and engaged with the first helical gear unit.

5. The refrigerator of claim 4, wherein the screw unit is disposed at each of both sides of the motor assembly,
- the one or more transmission gears to transmit the power from the driving gear to a pair of first helical gear units, and
- the pair of first helical gears are engaged with a final gear of the one or more transmission gears.

6. The refrigerator of claim 5, wherein the pair of first helical gear units are spaced apart from each other in a left-right direction, and the pair of first helical gear units are engaged with the final gear with rotational centers thereof positioned lower than a rotational center of the final gear.

7. The refrigerator of claim 6, wherein a plurality of second helical gear unit are connected to the respective first helical gear units, and
- shafts connected to the respective second helical gear units separate further from each other as they extend upward.

8. The refrigerator of claim 5, wherein the final gear is a spur gear, and
- each of the first helical gear unit includes a spur gear engaged with the final gear and a helical gear extending from the spur gear of the first helical gear.

9. The refrigerator of claim 5, wherein a rotational center line of the first helical gear unit and a rotational center line of the second helical gear unit are crossed with respect to each other.

10. The refrigerator of claim 9, wherein the rotational center line of the first helical gear unit extends horizontally and the rotational center line of the second helical gear unit extends in an up-down direction.

11. The refrigerator of claim 5, wherein each the of screw unit includes a housing to accommodate the screw,
- the housing includes:
  - a first accommodating part to accommodate the screw; and
  - a second accommodating part to accommodate the second helical gear unit; and
  - a partition wall.

12. The refrigerator of claim 11, wherein the second accommodating part is positioned under the first accommodating part, and
- the screw passes through the partition wall and the second helical gear unit is coupled to the screw passing through the partition wall.

13. The refrigerator of claim 11, wherein the screw unit further includes one or more guide bars extending in parallel with the screw and guide movement of the screw holder.

14. The refrigerator of claim 13, wherein the screw unit includes a plurality of guide bars, and
- the screw is positioned between the plurality of the guide bars.

15. The refrigerator of claim 1, wherein the motor assembly includes a motor case in which the driving motor is disposed,
- the screw unit includes a housing to accommodate the screw, and
- the motor case and the housing are integrally formed.

16. The refrigerator of claim 15, wherein the motor assembly further includes a motor cover to cover the driving motor disposed at the motor case,
- the power transmission unit is disposed opposite to the driving motor with the motor case therebetween, and
- a single cover member is coupled to the motor case and the housing to cover the power transmission unit and the screw.

17. The refrigerator of claim 1, wherein the elevation device includes:
- a lower frame fixed to the drawer unit;
- an upper frame disposed over the lower frame and to support food or one or more containers; and
- a scissor assembly in which a plurality of scissor frames connecting the upper frame and the lower frame are connected by a shaft, and
- the scissor assembly is connected to the lever.

18. The refrigerator of claim 17, wherein the scissor assembly includes an extending portion to pass through an opening of the drawer unit to be connected with the lever, and a coupling portion to extend from the extending portion, and
- the lever includes an accommodating portion to accommodate the coupling portion and be coupled to the coupling portion.

19. A refrigerator comprising:
- a cabinet having a storage space;
- a door including a door unit to open or close the storage space and a drawer unit to provide a receiving space;
- rails to connect the door and the cabinet through which the door is drawn in or out of the cabinet;
- a driving device disposed at the door unit to provide power; and
- an elevation device disposed at the drawer unit and connected with the driving device to move the drawer unit up or down,
- wherein the driving device includes:
- a motor assembly including a driving motor;
- a plurality of screw units, each of the screw unit including a screw to be rotated by the motor assembly and a screw holder to move up or down along the screw; and
- a plurality of levers connected to the screw holders of the plurality of screw units and the elevation device, and the levers rotate when the screw holders move up or down, and
- the screws of the plurality of screw units are disposed such that extending lines from center axes of the screws cross each other.

20. The refrigerator of claim 19, wherein intersections of the extending lines of the screws are positioned under the driving motor.

* * * * *